(12) United States Patent
Huang et al.

(10) Patent No.: US 10,792,750 B2
(45) Date of Patent: *Oct. 6, 2020

(54) METHODS FOR MANUFACTURING A ROTOR ASSEMBLY FOR AN ELECTRICAL MACHINE

(71) Applicant: GE Aviation Systems LLC, Grand Rapids, MI (US)

(72) Inventors: Hao Huang, Troy, OH (US); Xiaochuan Jia, Centerville, OH (US); Joshua Tyler Mook, Loveland, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 340 days.

This patent is subject to a terminal disclaimer.

(21) Appl. No.: 15/671,321

(22) Filed: Aug. 8, 2017

(65) Prior Publication Data

US 2018/0200823 A1 Jul. 19, 2018

Related U.S. Application Data

(60) Provisional application No. 62/445,867, filed on Jan. 13, 2017.

(51) Int. Cl.
*H02K 15/02* (2006.01)
*B23K 9/04* (2006.01)
(Continued)

(52) U.S. Cl.
CPC ............ *B23K 9/044* (2013.01); *B22F 3/1055* (2013.01); *B23K 9/0953* (2013.01); *B33Y 10/00* (2014.12);
(Continued)

(58) Field of Classification Search
CPC ...... H02K 15/00; H02K 5/1732; H02K 3/527; H02K 5/161; H02K 15/02; H02K 1/26; Y10T 29/49009; Y10T 29/49012
(Continued)

(56) References Cited

U.S. PATENT DOCUMENTS 5,189,325 A 2/1993 Jarczynski
6,159,305 A 12/2000 Kilman et al.
(Continued)

FOREIGN PATENT DOCUMENTS

CN 103931081 A 7/2014
DE 9003390 U1 6/1990
(Continued)

OTHER PUBLICATIONS

U.S. Appl. No. 15/671,298, filed Aug. 8, 2017.
(Continued)

*Primary Examiner* — Thiem D Phan
(74) *Attorney, Agent, or Firm* — Dority & Manning, P.A.

(57) ABSTRACT

A method for manufacturing a rotor assembly for an electrical machine includes printing a first part of a rotor shaft. The method also includes printing a rotor core onto the first part of the rotor shaft. In addition, the method includes printing a second part of the rotor shaft onto the rotor core; printing a first part of the rotor winding. The method also includes coupling the first part of the rotor winding to the rotor core. After coupling the first part of the rotor winding to the rotor core, the method includes printing a second part of the rotor winding onto the first part of the rotor winding to form the rotor assembly.

20 Claims, 26 Drawing Sheets

(51) Int. Cl.

| | | |
|---|---|---|
| *B23K 9/095* | (2006.01) | |
| *H02K 1/02* | (2006.01) | |
| *H02K 1/24* | (2006.01) | |
| *H02K 1/26* | (2006.01) | |
| *H02K 1/28* | (2006.01) | |
| *H02K 1/32* | (2006.01) | |
| *H02K 19/02* | (2006.01) | |
| *H02K 19/16* | (2006.01) | |
| *H02K 3/18* | (2006.01) | |
| *H02K 3/52* | (2006.01) | |
| *H02K 9/22* | (2006.01) | |
| *B22F 3/105* | (2006.01) | |
| *B33Y 10/00* | (2015.01) | |
| *H02K 9/02* | (2006.01) | |
| *H02K 9/19* | (2006.01) | |
| *B22F 5/00* | (2006.01) | |

(52) U.S. Cl.
CPC ............... *H02K 1/02* (2013.01); *H02K 1/24* (2013.01); *H02K 1/26* (2013.01); *H02K 1/28* (2013.01); *H02K 1/32* (2013.01); *H02K 3/18* (2013.01); *H02K 3/527* (2013.01); *H02K 9/22* (2013.01); *H02K 19/02* (2013.01); *H02K 19/16* (2013.01); *B22F 5/008* (2013.01); *B22F 5/009* (2013.01); *B22F 2003/1057* (2013.01); *B22F 2998/10* (2013.01); *B22F 2999/00* (2013.01); *H02K 9/02* (2013.01); *H02K 9/19* (2013.01); *Y10T 29/49012* (2015.01)

(58) Field of Classification Search
USPC .......... 29/598, 596, 604, 606, 608, 609, 732
See application file for complete search history.

(56) References Cited

U.S. PATENT DOCUMENTS

| 7,342,231 | B2 * | 3/2008 | Warburton | ............... G01T 1/172 |
| | | | | 250/356.2 |
| 7,687,928 | B2 | 3/2010 | Taneja et al. | |
| 8,232,702 | B2 | 7/2012 | Zywot et al. | |
| 8,787,651 | B2 | 7/2014 | Potts et al. | |
| 9,252,642 | B2 | 2/2016 | Buttner et al. | |
| 9,419,502 | B2 | 8/2016 | Veronesi et al. | |
| 9,837,868 | B2 | 12/2017 | Wirsch, Jr. et al. | |
| 10,008,910 | B2 | 6/2018 | Jahshan | |
| 2003/0030333 | A1 | 2/2003 | Johnsen | |
| 2012/0126643 | A1 * | 5/2012 | Zhong | ............... H02K 1/32 |
| | | | | 310/59 |
| 2013/0207395 | A1 | 8/2013 | Huang et al. | |
| 2014/0035423 | A1 | 2/2014 | Veronesi et al. | |
| 2015/0022035 | A1 | 1/2015 | Yamada et al. | |
| 2016/0053858 | A1 | 2/2016 | Brassitos et al. | |
| 2016/0149451 | A1 | 5/2016 | Teter et al. | |
| 2016/0204663 | A1 | 7/2016 | Huang et al. | |
| 2016/0285332 | A1 | 9/2016 | Huang et al. | |
| 2016/0352174 | A1 | 12/2016 | Huang et al. | |
| 2017/0063183 | A1 | 3/2017 | Shrestha et al. | |
| 2017/0234161 | A1 | 8/2017 | Bunker | |

FOREIGN PATENT DOCUMENTS

| DE | 102011121793 A1 | 6/2013 |
| EP | 0415057 A1 | 3/1991 |
| WO | WO2015/034514 A1 | 3/2015 |
| WO | WO2015/034544 A2 | 3/2015 |
| WO | WO2015/034545 A2 | 3/2015 |

OTHER PUBLICATIONS

U.S. Appl. No. 15/671,336, filed Aug. 8, 2017.
U.S. Appl. No. 15/671,344, filed Aug. 8, 2017.
U.S. Appl. No. 15/671,358, filed Aug. 8, 2017.
U.S. Appl. No. 15/976,014, filed May 10, 2018.
Combined Chinese Office Action and Search Report Corresponding to Application No. 20180030869 dated Apr. 3, 2020.

* cited by examiner

METHODS FOR MANUFACTURING A ROTOR ASSEMBLY FOR AN ELECTRICAL MACHINE

PRIORITY CLAIM

The present application claims the benefit of priority of U.S. Provisional Patent Application No. 62/445,867, entitled "PRINTED ROTOR FOR ELECTRICAL MACHINE," filed Jan. 13, 2017, which is incorporated herein by reference for all purposes.

FIELD

The present subject matter relates generally to additively manufactured components, and more particularly, to electrical machinery and methods for manufacturing electrical machinery.

BACKGROUND

Electrical machinery, such as generators, motors, motor/generators, starter/generators, and other electrical machinery can be used for a variety of purposes. An electrical machine can include a stator and a rotor. The rotor can be rotated relative to the stator to generate electrical energy and/or can be rotated relative to the stator as a result of changing magnetic fields induced in windings of the stator.

Typical methods of manufacturing an electrical machine can include, for instance, manufacturing a stator or other component by stacking oxidized lamination sheets to form a core, winding coils made of insulated wire, inserting slot liners and coils into slots of the core, sliding slot wedges at the top of a slot, forming end turns, and varnishing the stator and/or rotor assembly.

BRIEF DESCRIPTION

Aspects and advantages of embodiments of the present disclosure will be set forth in part in the following description, or may be learned from the description, or may be learned through practice of the embodiments.

In an example embodiment, a method for manufacturing a rotor assembly for an electrical machine includes printing a first part of a rotor shaft. The method also includes printing a rotor core onto the first part of the rotor shaft. In addition, the method includes printing a second part of the rotor shaft onto the rotor core; printing a first part of the rotor winding. The method also includes coupling the first part of the rotor winding to the rotor core. After coupling the first part of the rotor winding to the rotor core, the method includes printing a second part of the rotor winding onto the first part of the rotor winding to form the rotor assembly.

In some implementations, printing the first part of the rotor shaft comprises printing the first part of the rotor shaft using a first material, and wherein printing the rotor core comprises printing the rotor core using a second material that is different than the first material.

In some implementations, printing the rotor core comprises printing a first lamination sheet; printing at least one spacer after printing the first lamination sheet; and printing a second lamination sheet after printing the at least one spacer. In particular, the at least one spacer is positioned between the first lamination sheet and the second lamination sheet.

In some implementations, the at least one spacer is formed from a first material having a high resistivity relative to a second material that is used to form the both the first lamination sheet and the second lamination sheet.

In some implementations, printing the rotor core comprises printing, by a first projection, wherein printing the first part of the rotor winding comprises printing a second projection, and wherein the first projection contacts the second projection when the first part of the rotor winding is coupled to the rotor core.

In some implementations, the method includes applying a varnish or epoxy to the rotor assembly; removing the first projection from the rotor core after applying the varnish or epoxy; and removing the second projection from the first part of the rotor winding after applying the varnish or epoxy.

In some implementations, applying the varnish or epoxy to the rotor assembly comprises potting the epoxy to the rotor assembly.

In some implementations, applying the varnish or epoxy to the rotor assembly comprises electrophoretically depositing the varnish or epoxy onto the rotor assembly.

In another example embodiment, a method for manufacturing an electrical machine includes printing, by a three-dimensional (3D) printing process, a stator assembly. The method also includes printing, by the 3D printing process, a first part of a rotor shaft. In addition, the method includes printing, by the 3D printing process, a rotor core onto the first part of the rotor shaft. The method also includes printing, by the 3D printing process, a second part of the rotor shaft onto the rotor core. In addition, the method includes printing, by the 3D printing process, a first part of a rotor winding. The method also includes coupling the first part of the rotor winding to the rotor core. After coupling the first part of the rotor winding to the rotor core, the method includes printing, by the 3D printing process, a second part of the rotor winding onto the first part of the rotor winding to form a rotor assembly. In particular, the 3D printing process comprises fusing metal using laser energy or heat.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
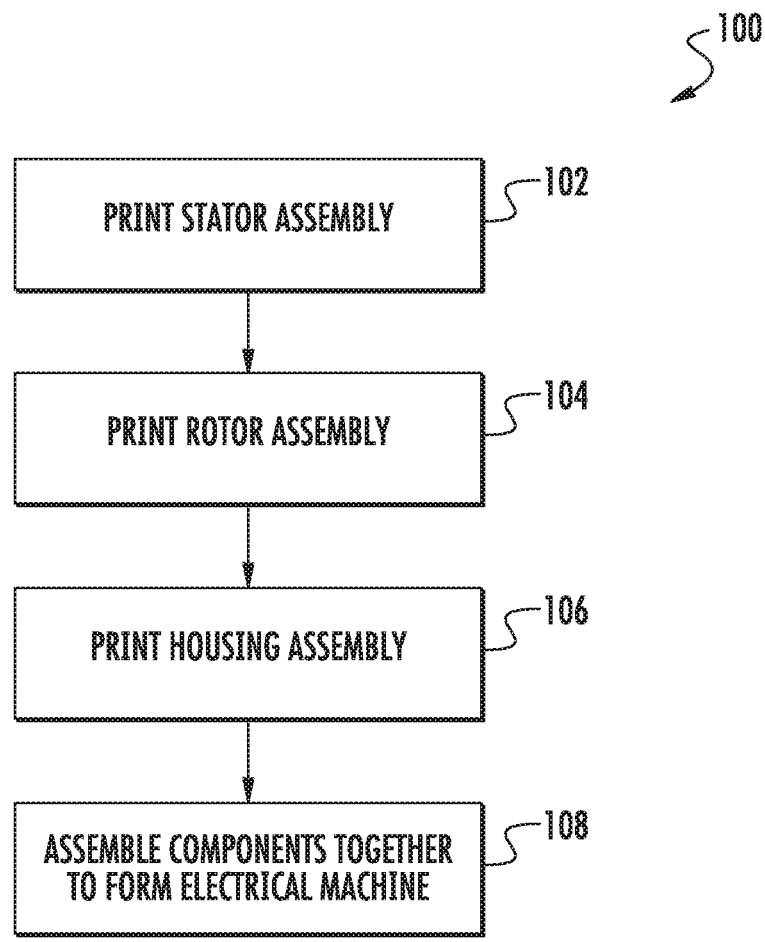
FIG. 1 depicts a flow diagram of an example method for manufacturing an electrical machine according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to additively manufactured or "printed" components of electrical machinery (e.g., rotary electrical machines) and/or to methods for manufacturing the same. As used herein, use of the term "printed" or "printing" refers to, for instance, manufacturing processes wherein successive layers of material(s) are provided on each other to "build-up", layer-by-layer, a three-dimensional component. Example manufacturing processes for printing metal components of an electrical machine will be discussed in detail below.

The electrical machinery can be manufactured, for instance, by printing a stator assembly according to example aspects of the present disclosure, printing a rotor assembly according to example aspects of the present disclosure, and printing a housing (including the cooling jacket and/or end caps) according to example embodiments of the present disclosure. The components can then be assembled together to form an electrical machine. Example electrical machines that can be assembled according to example embodiments of the present disclosure can include generators, motors, motor/generators, starter/generators, etc. In some embodiments, the electrical machine can be air cooled. In some embodiments, the electrical machine can be liquid cooled. In some embodiments, the electrical machine can be a wet cavity machine, a dry cavity machine, and/or wet/dry combination.

In example embodiments, a method for manufacturing a stator assembly for an electrical machine can include: printing a stator core of an electrical machine; printing a first part of a stator winding to be coupled to the stator core, coupling the first part of the stator winding to the stator core, and printing the second part of stator winding onto the first part of the stator winding to form the stator assembly. A varnish or epoxy can then be applied to the stator assembly. In particular, the varnish or epoxy can be potted (e.g., with epoxy) or electrophoretic deposited. In this way, the lamination to lamination, ground insulation, turn-to-turn insulation, and phase-to-phase insulation can be established. As will be discussed below in more detail, a first projection printed as part of the stator core and a second projection as part of the first part of the stator winding can be removed after the varnish or epoxy has been applied to the stator assembly.

In some embodiments, a stator core can be printed by printing lamination sheets with printed spacers between the lamination sheets. The spacers can be small enough to make eddy current losses negligible in the stator core. In some embodiments, a higher resistivity metal relative to the metal used for the lamination sheets may be used for the spacers to further reduce eddy current losses cause by space between lamination sheets. A desired slot skew can be printed along with the lamination sheets. A slot wedge can be printed along with the lamination sheets. Additional temporary shapes (e.g., first projection) can be added to the lamination sheets along with the spacers, and these additions along with the spacers can be removed after varnishing, potting, depositing etc.

In some embodiments, a stator winding can be printed in two parts. More specifically, a first part can be printed that includes bottom end turns and a plurality of coils for insertion into slots defined by the stator core. In some embodiments, the second projection can be printed as part of the first part of the winding. Then, when coupling the first part of the stator winding to the stator core, the first projection can contact the second projection. In this way, the first and second projections can ensure space between phases, space between turns, space between coils and slots, space between end turns and core face, etc. Once the first part of the stator winding is coupled to the stator core, a second part of the winding (e.g., the top end turns) can be printed onto the first part of the stator winding to form the stator assembly. In example embodiments, the wire for the windings and other components can be printed in solid wire, multi-strain wire, Litz wire or hollow wire.

After printing the second part of the stator winding, a varnish or epoxy can be applied to the stator assembly. In an example embodiment, applying the varnish or epoxy can include potting the epoxy onto the stator assembly. Alternatively, applying the varnish or epoxy can include electrophoretically depositing the epoxy onto the stator assembly. After applying the varnish or epoxy, spaces in the stator assembly can be filled with insulation. In addition, the first projection can be removed from the stator core, and the second projection can be removed from the first part of the stator winding.

In example embodiments, the rotor shaft and the rotor core can be printed as an integrated piece. Optionally, cooling tubes can be included as part of the rotor core. The additional cooling tubes can enhance heating dissipation capability of the rotor. In some embodiments, the cooling tubes can be printed as part of the core instead of being manufactured as separate pieces from the core and welded on the shaft.

For instance, in some embodiments, a first part of a rotor shaft can be printed layer by layer until the first part of the rotor shaft reaches a desired height. The first part of the rotor shaft can be printed using a relatively low cost material relative to a material used to print the rotor core. After printing the first part of the rotor shaft, the rotor core can then be printed as a plurality of lamination layers separated by spacers. In example embodiments, the shaft area passing through the rotor core can be printed as solid layers. Once the rotor core has been printed, a second part of the rotor shaft can be printed layer by layer until it reaches a desired height. The second part of the rotor shaft can be printed using the same material as the first part of the rotor shaft. In some embodiments, at least one damp bar can be inserted into one of a plurality of slots defined by the rotor core. Alternatively or additionally, at least one damp ring can be printed and coupled to at least one end of the rotor core.

In some embodiments, a winding for the rotor can be printed in two parts. More specifically, a first part of the rotor winding can be printed that includes bottom end turns and the coils for insertion into the rotor core. In some embodiments, a first projection printed as part of the rotor core can contact a second projection printed as part of the first part of the rotor winding. More specifically, when the first part of the rotor winding is coupled to the rotor core, the first projection can contact the second projection to ensure space between turn-to-turn, space between coils and slots, space between end turns and core face, etc. Once the first part of the rotor winding is coupled to the rotor core, a second part of the winding (e.g., the top end turns) can be printed onto the first part of the winding to form the rotor assembly.

After printing the second part of the rotor winding, a varnish or epoxy can be applied to the rotor assembly. In an example embodiment, applying the varnish or epoxy can include potting the epoxy onto the rotor assembly. Alternatively, applying the varnish or epoxy can include electrophoretically depositing the epoxy onto the rotor assembly. After applying the varnish or epoxy, spaces in the rotor assembly can be filled with insulation. In addition, the first projection can be removed from the rotor core and the second projection can be removed from the first part of the rotor winding. Still further, all associated accessories of the rotor assembly (e.g., end caps, retaining rings, etc.) can be coupled to at least one of the rotor core and rotor shaft.

In example embodiments, a housing for the electrical machine can be printed layer by layer. In some embodiments, the housing can be printed layer-by-layer perpendicular to the centerline that goes through two bearing centers. In some embodiments, the housing can include a cooling jacket that is integral with the housing. In some embodiments, the housing can be integral with the stator core. In addition, a cooling jacket can be integral with the housing that is integral with the stator core. Once the stator, rotor, and housing have been manufactured according to example embodiments of the present disclosure, the components can be assembled to form an electrical machine.

For example, one example embodiment of the present disclosure is directed to a method of manufacturing an electrical machine having a main, an exciter, and a permanent magnet generator (PMG) integrated as part of single electrical machine. The present example is provided for purposes of illustration and discussion. Those of ordinary skill in the art, using the disclosures provided herein, will understand that the example processes and techniques discussed herein can be used for manufacturing other electrical machines without deviating from the scope of the present disclosure.

The various components of the electrical machine can be printed according to example embodiments of the present disclosure. For example the main stator, the exciter stator, and the PMG stator can all be printed according to example aspects of the present disclosure. The stators and the exciter armature can then be varnished, potted, or deposited.

A main rotor including rotor core (with winding) and rotor shaft can be printed. The main rotor can be varnished, potted, or deposited. In addition, other components (e.g., end cap, retaining rings, etc.) can be added. The exciter rotor can be printed according to example embodiments of the present disclosure. The PMG rotor can be printed according to example aspects with the present disclosure with slots for permanent magnets. The exciter rotor can be varnished. Various components associated with the rotor can then be assembled, such as a rotating rectifier, bearings, seals, etc. Electrical connections to the components of the rotor can be added.

A housing for the electrical machine can be printed. In some embodiments, air cooling fins and/or a liquid cooling jacket can be printed as part of the housing. End caps for the electrical machine can also be printed.

The electrical machine can be assembled by assembling a front end cap to the housing. The three stators (main, exciter, PMG) can be assembled into the housing. Current transformers (CTs) can be assembled into the housing. The rotor (with rotating rectifier, etc.) can be assembled into the stator. The rear end cap can be added to the housing, and appropriate electrical connections can be added.

In accordance with example aspects of the present disclosure, various components may be formed or "printed" using an additive-manufacturing process, such as a 3-D printing process. The use of such a process may allow the components to be formed integrally, as a single monolithic component, or as any suitable number of sub-components. In particular, the manufacturing process may allow these components to be integrally formed and include a variety of features not possible when using prior manufacturing methods.

As used herein, the terms "additively manufactured" or "additive manufacturing techniques or processes" refer generally to manufacturing processes wherein successive layers of material(s) are provided on each other to "build-up", layer-by-layer, a three-dimensional component. In some embodiments, the successive layers generally fuse together to form a monolithic component which may have a variety of integral sub-components. Although additive manufacturing technology is described herein as providing for the fabrication of complex objects by building objects point-by-point, layer-by-layer, typically in a vertical direction, other methods of fabrication are possible and within the scope of the present disclosure. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Metal Laser Sintering (DMLS), and other known processes.

The additive manufacturing processes described herein may be used for forming components using any suitable material. More specifically, according to example embodiments, the components described herein may be formed in part, in whole, or in some combination of materials including but not limited to pure metals, cobalt alloys, iron-cobalt vanadium alloy, nickel alloys, chrome alloys, titanium, titanium alloys, magnesium, magnesium alloys, aluminum, aluminum alloys, austenite alloys such as nickel-chromium-based superalloys (e.g., those available under the name Inconel® available from Special Metals Corporation), and metal ceramic composite (e.g., an aluminum SiC matrix).

One skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if the material is powdered metal, the bond may be formed by a melting process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application.

An example additive manufacturing or printing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the component base, the surface, any surface features such as irregularities or datum features, as well as internal passageways, openings, support structures, etc. In one example embodiment, the three-dimensional design model is converted into a plurality of slices or segments, e.g., along a central (e.g., vertical) axis of the component or any other suitable axis. Each slice may define a two-dimensional (2D) cross section of the component for a predetermined height of the slice. The plurality of successive 2D cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing sintering metal powder using laser energy or heat. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 0.25 mil and 200 mil, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 mil, utilized during the additive formation process.

In addition, utilizing an additive process, the surface finish and features of the components may vary as needed depending on the application. For example, the surface finish may be adjusted (e.g., made smoother or rougher) by selecting appropriate laser parameters during the additive process. A rougher finish may be achieved by increasing laser scan speed or a thickness of the powder layer, and a smoother finish may be achieved by decreasing laser scan speed or the thickness of the powder layer. The scanning pattern and/or laser power can also be changed to change the surface finish in a selected area of the components.

Notably, in example embodiments, several features of the components described herein were previously not possible due to manufacturing restraints. However, the present disclosure advantageously utilizes current advances in additive manufacturing techniques to develop example embodiments of such components generally in accordance with the present disclosure. Additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin cross sectional layers and novel surface features. All of these features may be relatively complex and intricate for avoiding detection and/or impeding counterfeiting by a third party. In addition, the additive manufacturing process enables the manufacture of a single component having different materials such that different portions of the component may exhibit different performance characteristics. The successive, additive nature of the manufacturing process enables the construction of these features.

FIG. 1 depicts a flow diagram of an example method 100 of manufacturing an electrical machine according to example embodiments of the present disclosure. FIG. 1 depicts steps performed in a particular order for purposes of illustration and discussion. Those of ordinary skill in the art, using the disclosures provided herein, will understand that the steps of any of the methods disclosed herein can be adapted, expanded, include sub-steps, modified, omitted, performed simultaneously, and/or rearranged in various ways without deviating from the scope of the present disclosure.

At (102), the method 100 can include printing a stator assembly for the electrical machine. Example techniques for printing stator components will be discussed with reference to FIGS. 2-8.

At (104), the method 400 can include printing a rotor assembly for the electrical machine. Example techniques for printing rotor components will be discussed with reference to FIGS. 9-16;

At (106), the method 100 can include printing a housing for the electrical machine. Example techniques for printing housing components will be discussed with reference to FIG. 25;

At (108), the method 100 can include assembling the various components to form the electrical machine. One example method for assembling various components to form an example electrical machine will be discussed with reference to FIGS. 26 and 27.

Figure 2:
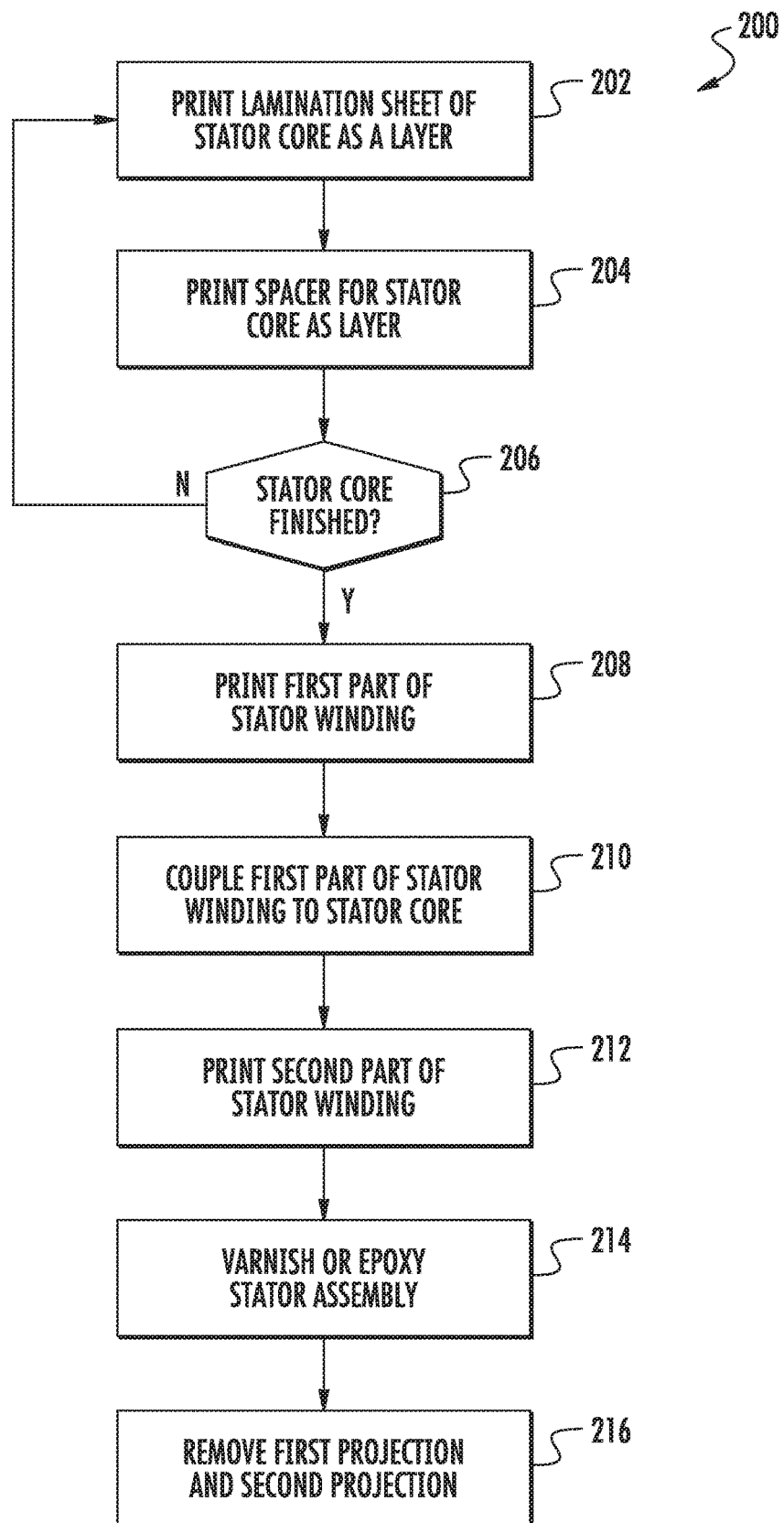
FIG. 2 depicts a flow diagram of an example method of manufacturing a stator assembly according to example embodiments of the present disclosure.

FIG. 2 depicts a flow diagram of an example method 200 for printing a stator assembly of an electrical machine according to example embodiments of the present disclosure. As discussed above, FIG. 2 depicts steps performed in a particular order for purposes of illustration and discussion. Those of ordinary skill in the art, using the disclosures provided herein, will understand that the steps of any of the methods disclosed herein can be adapted, expanded, include sub-steps, modified, omitted, performed simultaneously, and/or rearranged in various ways without deviating from the scope of the present disclosure.

At (202), the method 200 can include printing a first lamination sheet of a stator core as a layer. The desired slot skew and/or slot wedge can be designed and printed as part of the lamination sheet of the stator core.

Figure 3:
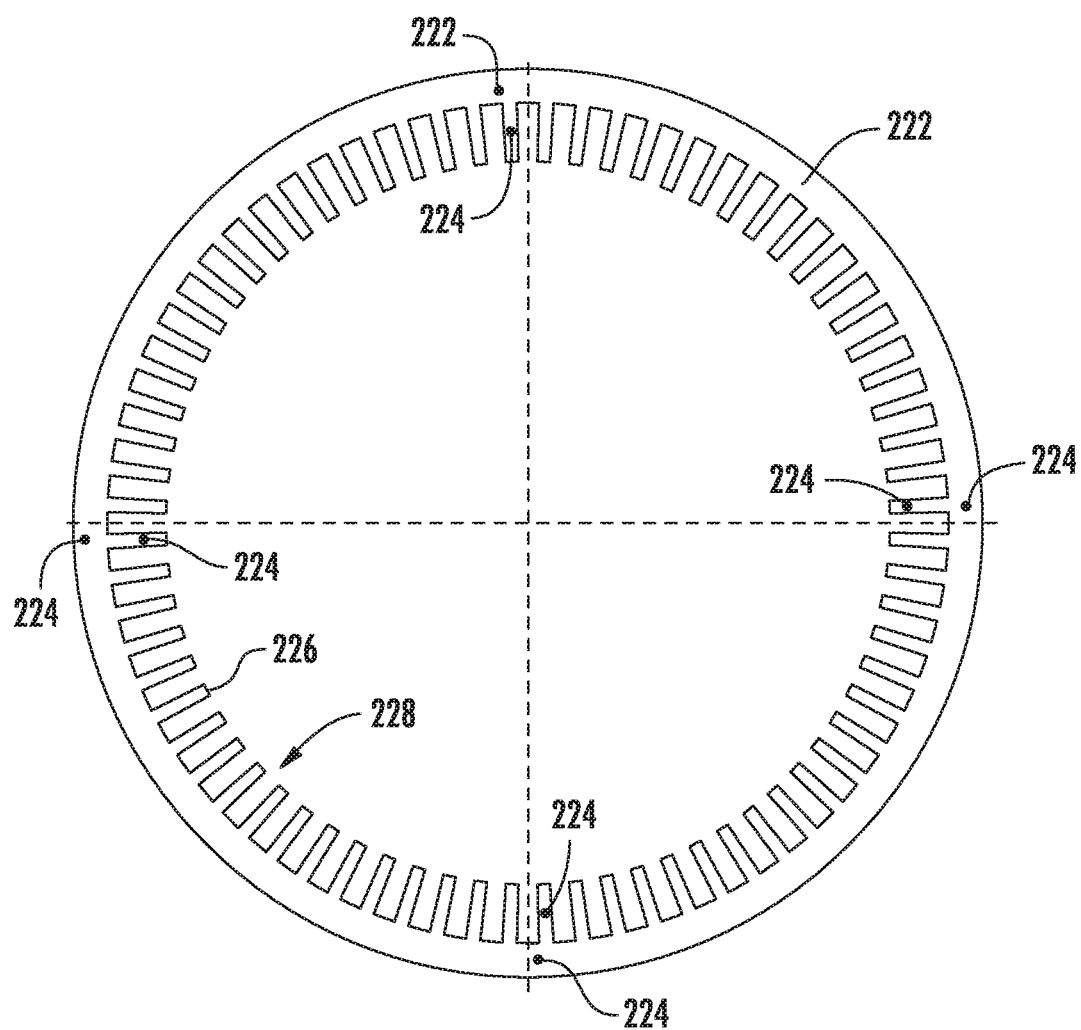
FIG. 3 depicts an example lamination sheet and spacer(s) for printing a stator core according to example embodiments of the present disclosure.

FIG. 3 depicts a plan view of an example lamination sheet 222 of a stator core 220 (shown in FIG. 4) printed according to example aspects of the present disclosure. The lamination sheet 222 can have a thickness in the range of, for instance, about 5 mil to about 20 mil, such as about 10 mil. The lamination sheet 222 can be printed, for instance, as an iron-cobalt-vanadium soft magnetic alloy (e.g. Hiperco50 Alloy). As shown, the desired slot skew 228 and slot wedge 226 can be designed for a stator core 220 and can be printed as part of the lamination sheet 222.

Figure 4:
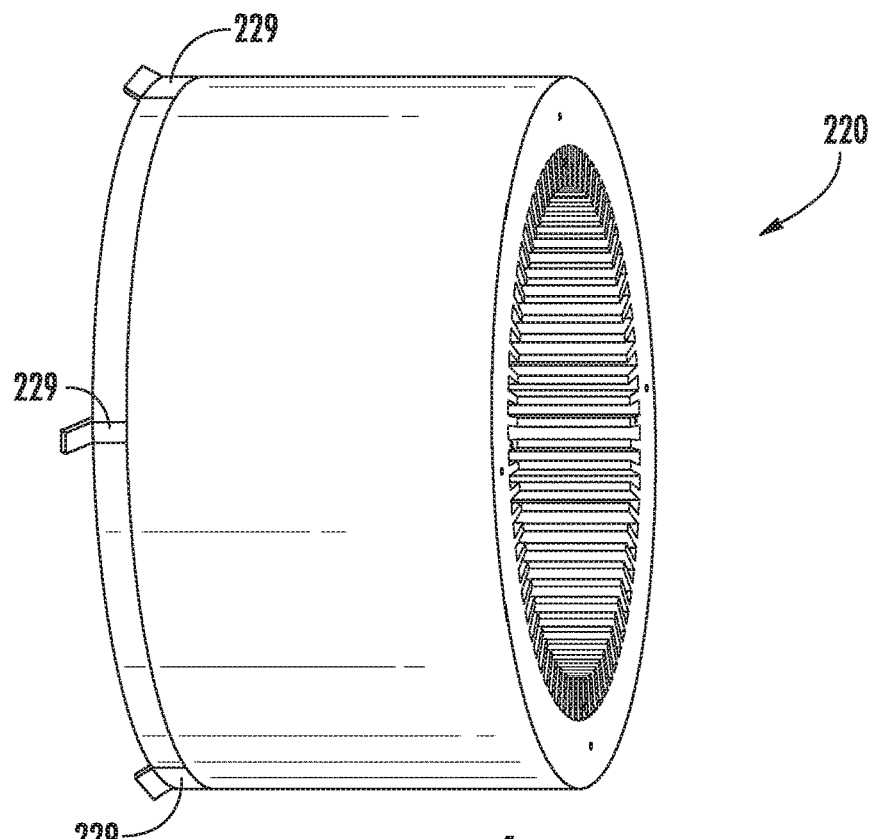
FIG. 4 depicts an example stator core printed according to example embodiments of the present disclosure.

In some embodiments, the bottom lamination sheet 222 of the stator core 220 can be printed with a first projection 229 as depicted in FIG. 4. In particular, the first projection 229 can be a tab. As will be discussed below in more detail, the first projection 229 can contact a second projection 236 (FIG. 5) that is printed as part of a stator winding. In this way, the first projection 229 and the second projection 236 can assist with coupling the stator winding with the stator core 220.

At (204), the method 200 can include printing at least one spacer for being disposed the lamination sheets. FIG. 3 depicts example spacers 224 for being disposed between the lamination sheets 222 of the stator core 220. The spacers 224 can have a thickness that is small enough to make eddy current losses negligible. In some embodiments, the spacers 224 can have a thickness that is less than a thickness of the lamination sheet 222. In some embodiments, the thickness of the spacers 224 can be in the range of, for instance, 0.25 mil to about 1 mil, such as about 0.5 mil. In alternative embodiments, a thickness of the spacers can be equal to 0 mil. In this way, harmonic frequencies in the rotor can be minimized.

The spacers 224 can be printed of any suitable material. In some embodiments, the spacers 224 are formed from a different material relative to the lamination sheet 222. For instance, the spacers 224 can be formed from a material having a higher resistivity relative to the material of the lamination sheet 220. In some embodiments, the material for the spacers 224 can be a nickel alloy, such as Inconel718 or other material.

Referring back to FIG. 2, printing the lamination sheet (202) and printing the spacers (204) can be repeated until the stator core is finished (206) or reaches a desired size (e.g., height). An example stator core 220 printed according to example embodiments of the present disclosure is depicted in FIG. 4.

Figure 5:
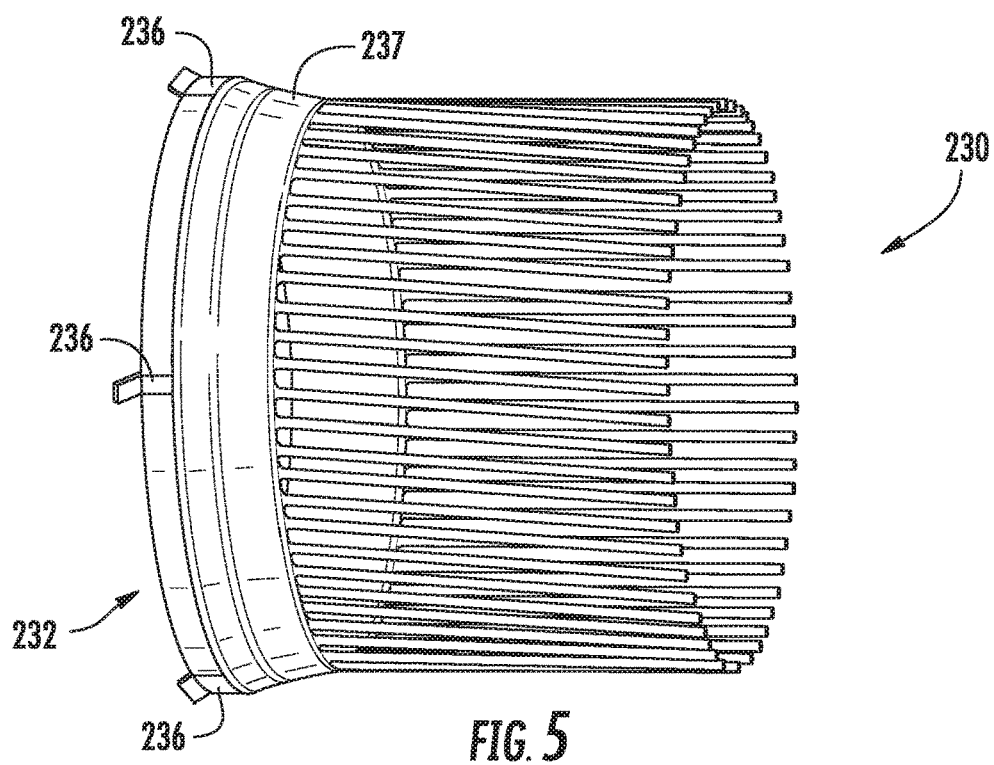
FIG. 5 depicts an example first part of a stator winding printed according to example embodiments of the present disclosure.

At (208), the method 200 can include printing a first part of a stator winding. For instance, bottom end turns 237 (FIG. 5) and coils (not shown) for the slots defined by the stator core can be printed as part of the first part of the stator winding. In some embodiments, the second projection can assist with positioning of the first part of the stator winding relative to the stator core. The second projection can provide space between phases, space between coils and slots, space between end turns and core face, etc. As mentioned above, the first projection and the second projection can contact one another when the first part of the stator winding is coupled to the stator core 220. FIG. 5 depicts an example first part 232 of the stator winding 230 according to example embodiments of the present disclosure.

Figure 6:
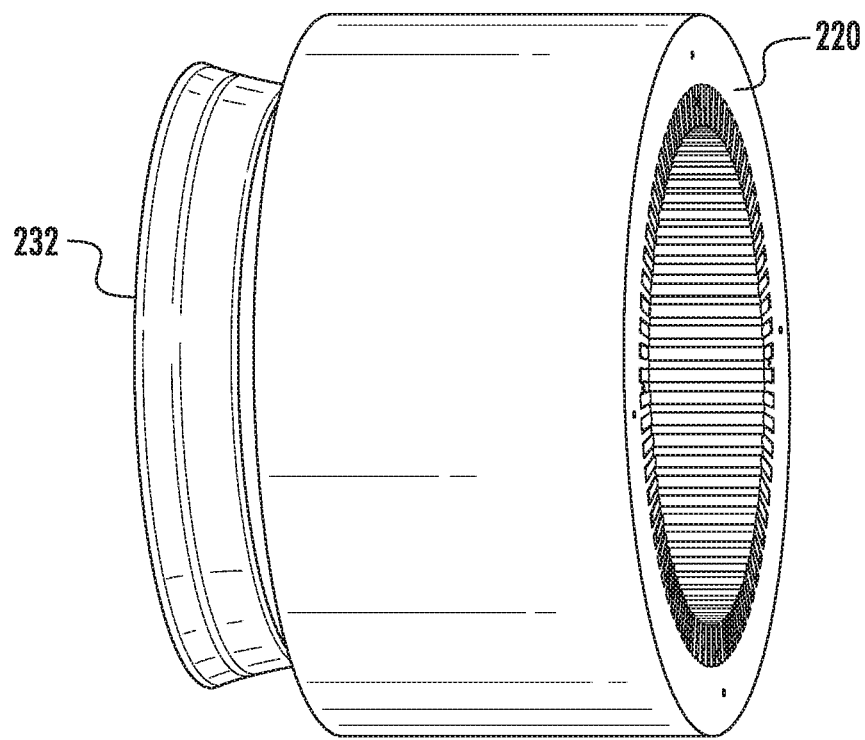
FIG. 6 depicts an example first part of a stator winding assembled with a stator core according to example embodiments of the present disclosure.
Figure 7:
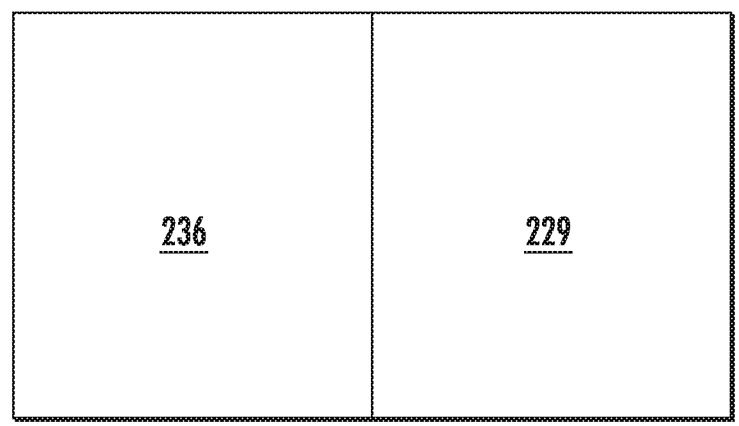
FIG. 7 depicts an example first projection of a stator core contacting an example second projection of a first part of a stator winding according to example embodiments of the present disclosure.

At (210), the method 200 can include coupling the first part of the stator winding to the stator core. FIG. 6 depicts the first part 232 of the stator winding 230 being coupled to the stator core 220 according to example aspects of the present disclosure. More specifically, FIG. 7 is a close-up view of FIG. 6 and depicts the first projection 229 contacting the second projection 236.

Figure 8:
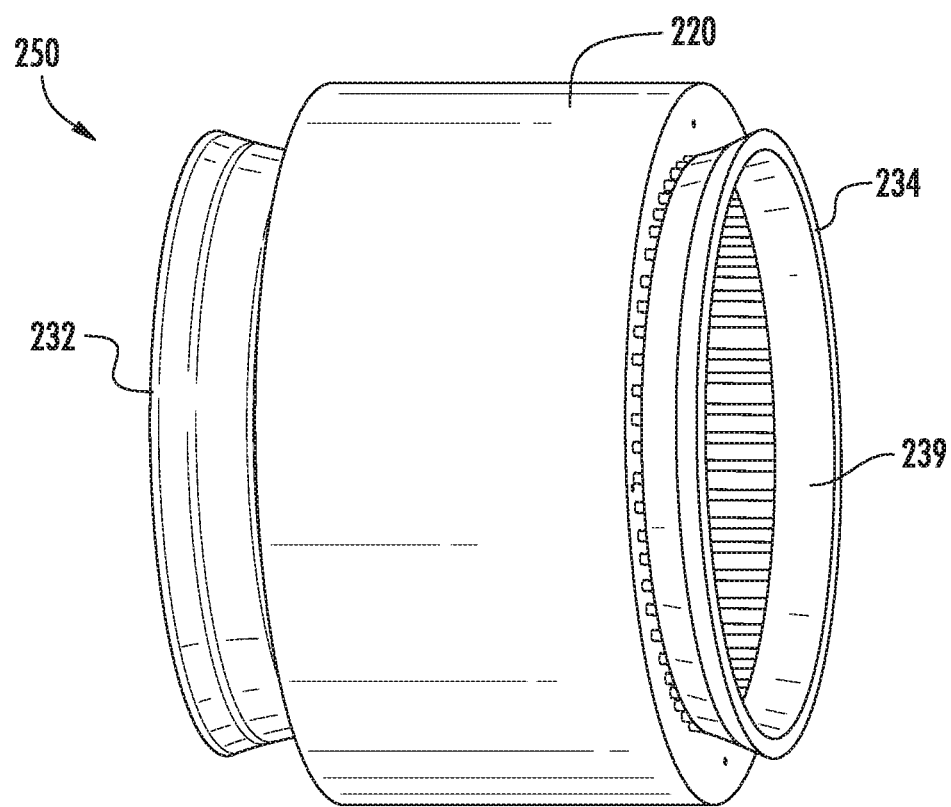
FIG. 8 depicts an example second part of a stator winding printed onto a first part of the stator winding according to example embodiments of the present disclosure.

Once the first part of the stator winding is coupled to the stator core, the method 200 can include printing a second part of the stator winding onto the first part of the stator winding as shown at (212) of FIG. 2. In this way, the stator assembly can be formed. FIG. 8 depicts an example stator assembly 250 that includes the second part 234 of the stator winding 230 printed onto the first part 232 of the stator winding 230 after the first part 232 of the stator winding 230 has been assembled with the stator core 220. As shown, the second part 232 of the stator winding 230 can include top end turns 239.

Referring to (214) of FIG. 2, the method 200 includes applying a varnish or epoxy to the stator assembly. In example embodiments, applying the varnish or epoxy can include potting the varnish or epoxy onto the stator assembly. Alternatively, applying the varnish or epoxy can include electrophoretically depositing the varnish or epoxy onto the stator assembly.

After applying the varnish or epoxy at (214), the method 200 can include, at (216), removing the first projection from the stator core and removing the second projection from the first part of the stator winding. In addition, spaces can be filled with insulation and/or electrical leads can be attached.

In some embodiments, wire for the stator assembly and/or other components of the electrical machine can be printed according to example aspects of the present disclosure. The wire for the windings and other components can be printed in solid wire or hollow wire. In some embodiments, litz wire or hollow wire can be printed.

Figure 9:
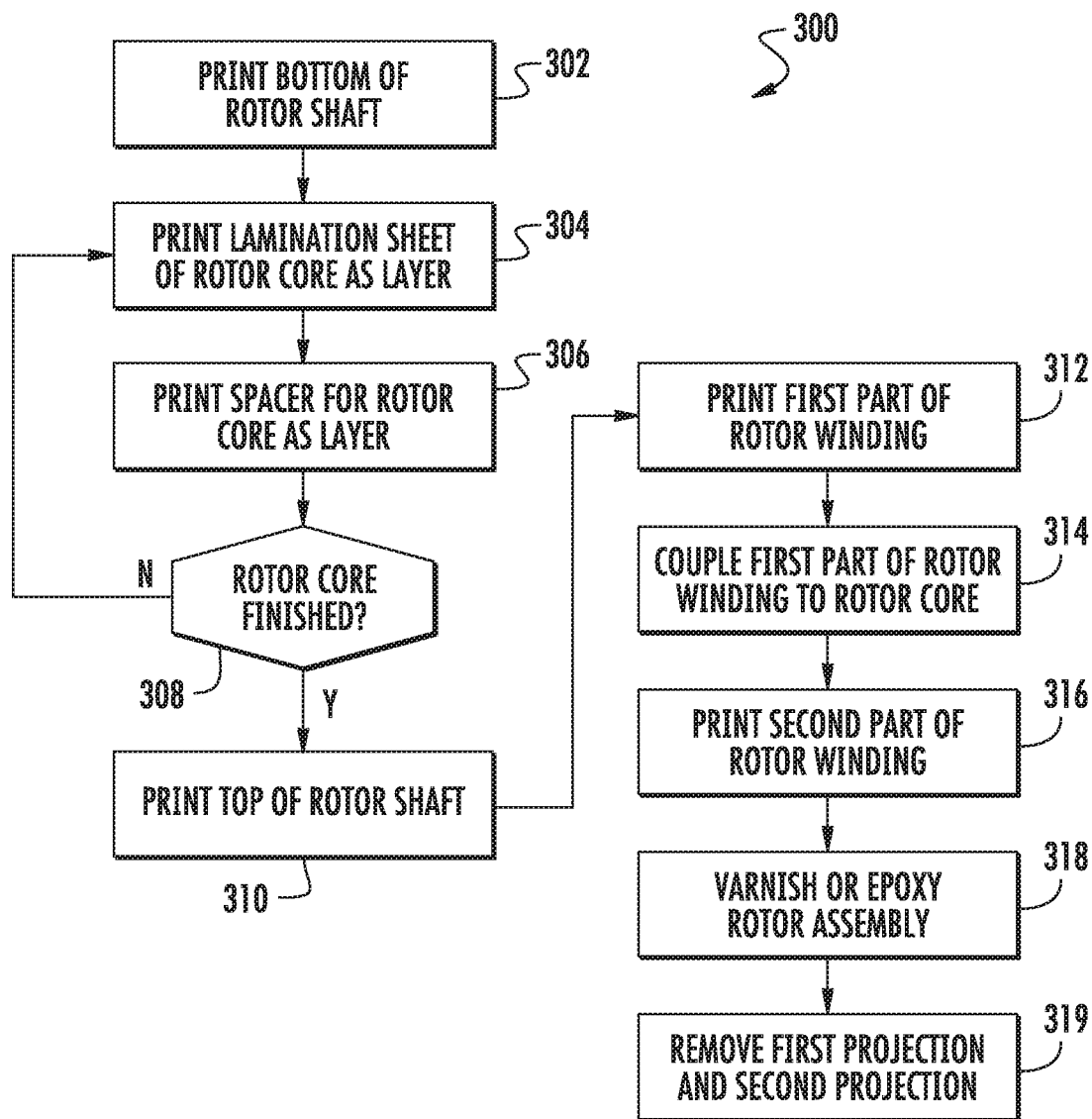
FIG. 9 depicts an example flow diagram of manufacturing a rotor assembly according to example embodiments of the present disclosure.

FIG. 9 depicts a flow diagram of an example method 300 for printing a rotor assembly of an electrical machine according to example embodiments of the present disclosure. As discussed above, FIG. 9 depicts steps performed in a particular order for purposes of illustration and discussion. Those of ordinary skill in the art, using the disclosures provided herein, will understand that the steps of any of the methods disclosed herein can be adapted, expanded, include sub-steps, modified, omitted, performed simultaneously, and/or rearranged in various ways without deviating from the scope of the present disclosure.

Figure 10:
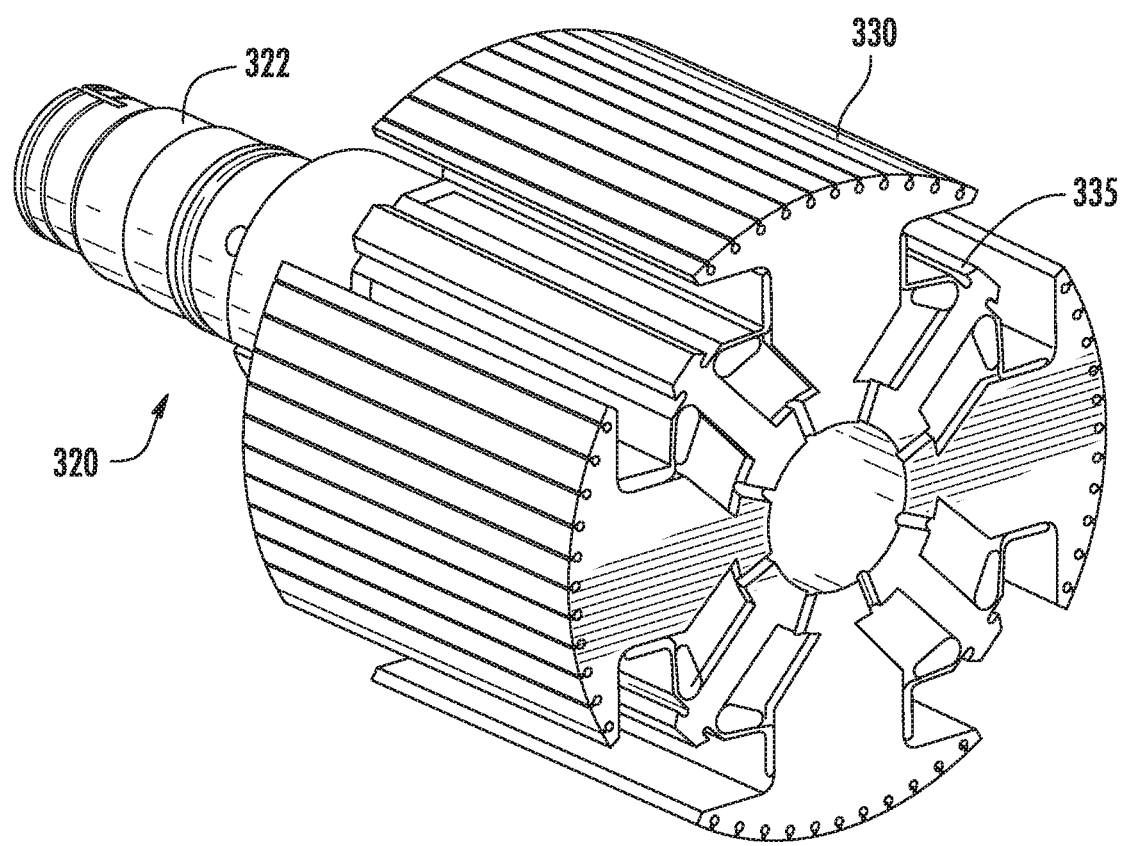
FIG. 10 depicts a portion of rotor core according to example embodiments of the present disclosure.

At (302), the method 300 can include printing a first or bottom portion of a rotor shaft layer by layer until it reaches a desired height. FIG. 10 depicts the first portion 322 of the rotor shaft 320 printed according to example embodiments of the present disclosure. The first portion of the rotor shaft can be printed of any suitable material. For example, in some embodiments, the first portion of the rotor shaft can be printed of a steel alloy, such as a #4340 steel alloy containing, for instance, nickel, chromium, and molybdenum. Other suitable materials can be used without deviating from the scope of the present disclosure.

At (304), the method 300 can include printing a lamination sheet of a rotor core as a layer. Desired features of the rotor core can be printed as part of the lamination sheet. For instance, features associated with one or more cooling tubes for the rotor core can be printed as part of the lamination sheet. In some embodiments, a shaft section for the rotor shaft passing through the rotor core can be printed as part of the lamination sheet. Alternative or additionally, a first projection 339 (FIG. 12) can be printed as part of the lamination sheet. As will be discussed below in more detail, the first projection can contact a second projection that is printed as part of a first part of a rotor winding. More specifically, the first projection can contact the second projection when coupling the first part of the rotor winding to the rotor core of the rotor assembly. In this way, positioning of the first part of the rotor winding relative to the rotor core can be controlled.

Figure 11:
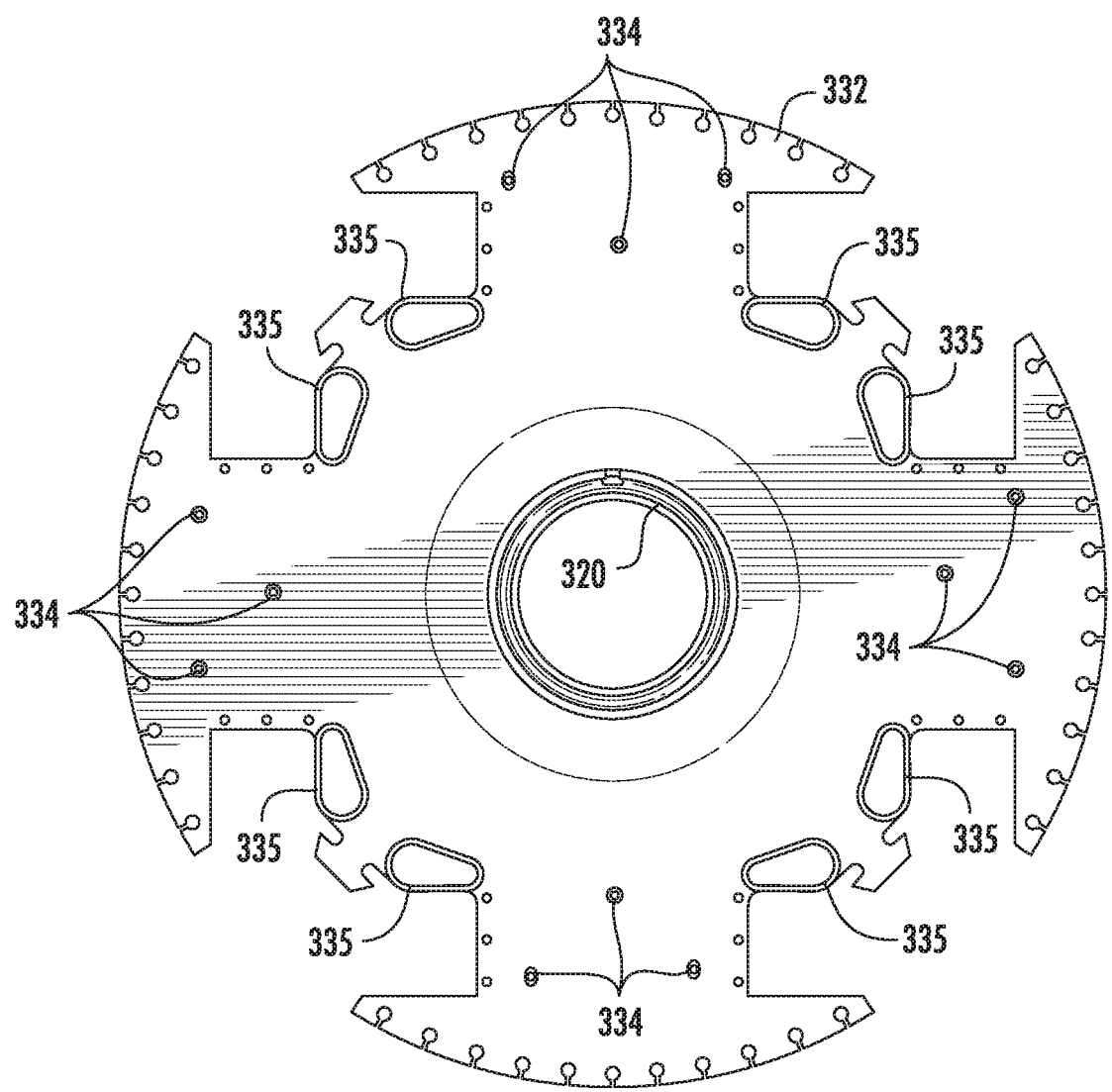
FIG. 11 depicts an example lamination sheet and spacer(s) for printing a rotor core according to example embodiments of the present disclosure.

FIG. 11 depicts an example lamination sheet 332 of a rotor core printed according to example aspects of the present disclosure. The lamination sheet 332 can have a thickness in the range of, for instance, about 5 mil to about 20 mil, such as about 10 mil. The lamination sheet 332 can be printed using, for instance, as an iron-cobalt-vanadium soft magnetic alloy (e.g. Hiperco50 Alloy). As shown, cooling tubes 335 can be printed as part of the lamination sheet 332. The cooling tubes 335 can be printed of the same material as the lamination sheet 332. For instance, the cooling tubes 335 can be printed as an iron-cobalt-vanadium soft magnetic alloy (e.g. Hiperco50 Alloy). In some embodiments, a portion of the rotor shaft 320 can also be printed as part of the lamination sheet. The portion of the rotor shaft 320 can be printed using the same or a different material than the lamination sheet 332

At (306), the method 300 can include printing spacers for being disposed between the lamination sheets of the rotor core. FIG. 11 depicts example spacers 334 for being disposed between the lamination sheets 332 of the rotor core. In some embodiments, the spacers 334 can have a thickness that is less than a thickness of the lamination sheet 332. In some embodiments, the thickness of the spacers 334 can be in the range of, for instance, 0.25 mil to about 1 mil, such as about 0.5 mil. The spacers 334 can be printed using any suitable material. In some embodiments, the spacers 334 are printed using the same material as the lamination sheet 332. For instance, the spacers 334 can be printed as an iron-cobalt-vanadium soft magnetic alloy (e.g. Hiperco50 Alloy). In some embodiments, the shaft portion of the rotor core 330 can be printed without spacers.

Referring back to FIG. 9, printing the lamination sheet at (304) and printing the spacers at (306) can be repeated as necessary until the rotor core is finished (308) or reaches a desired size (e.g., height). An example rotor core 330 printed according to example embodiments of the present disclosure is depicted in FIG. 10.

Figure 12:
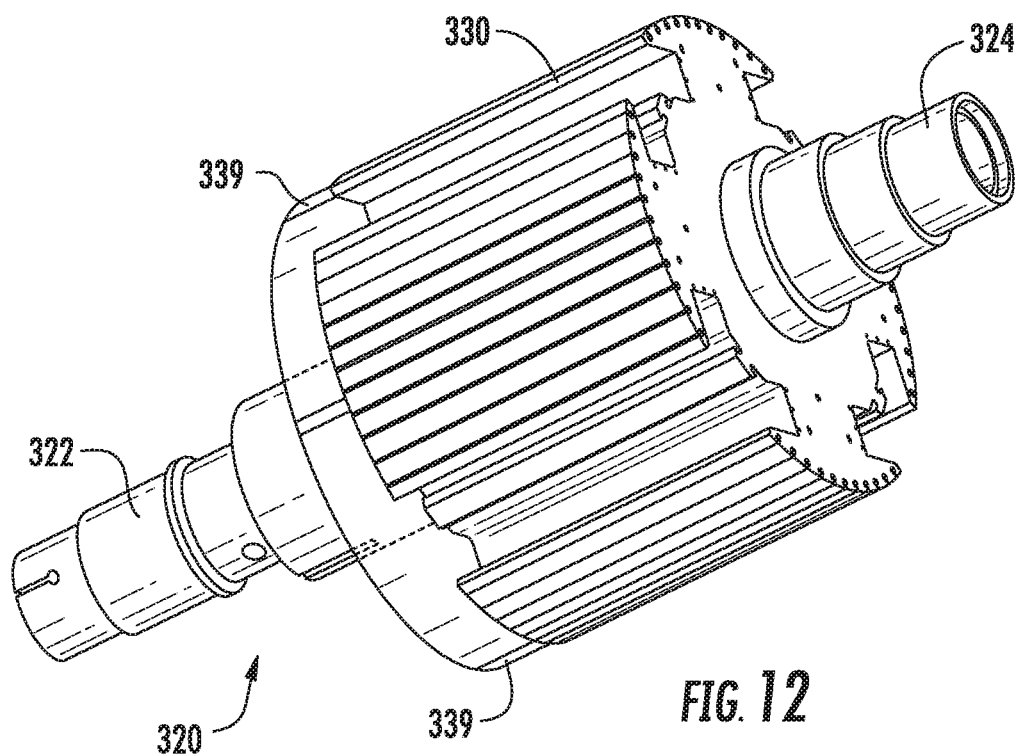
FIG. 12 depicts a rotor core printed according to example embodiments of the present disclosure.

Once the rotor core is finished, the method 300 can include at (310) printing a second or bottom portion of the rotor shaft layer by layer until it reaches a desired height. FIG. 12 depicts an example second portion 324 of a rotor shaft 320 printed according to example embodiments of the present disclosure. The second portion of the rotor shaft can be printed of any suitable material. For example, in some embodiments, the second portion 324 of the rotor shaft 320 can be printed of a steel alloy, such as a #4340 steel alloy containing, for instance, nickel, chromium, and molybdenum. Other suitable materials can be used without deviating from the scope of the present disclosure.

Figure 13:
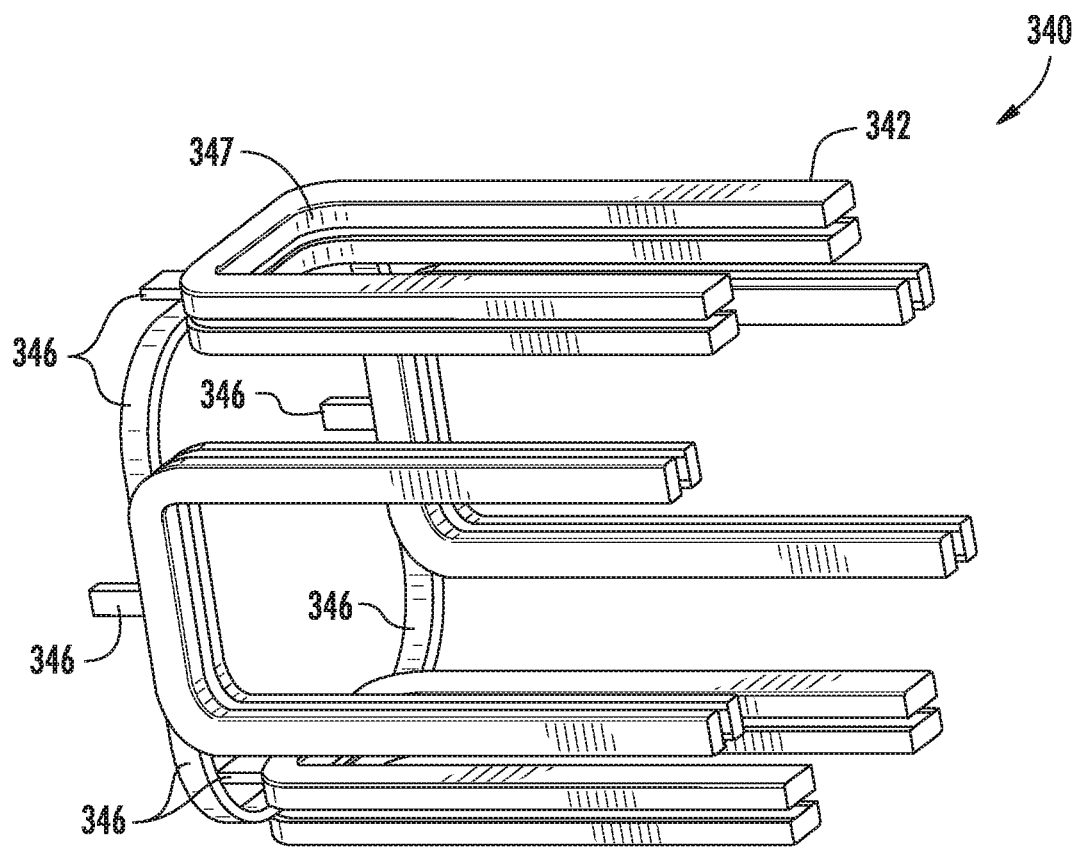
FIG. 13 depicts a first part of a rotor winding printed according to example embodiments of the present disclosure.

Referring to (312) of FIG. 9, the method 300 can include printing a first part of the rotor winding. As mentioned above, the first part of the rotor winding can include a second projection 346 (FIG. 13). In particular, the second projection 346 can be printed as part of the first part of the rotor winding. FIG. 13 depicts the first part 342 of the rotor winding 340 printed according to example embodiments of the present disclosure. As shown, bottom end turns 347 can be printed as part of the first part 342 of the rotor winding 340.

Figure 14:
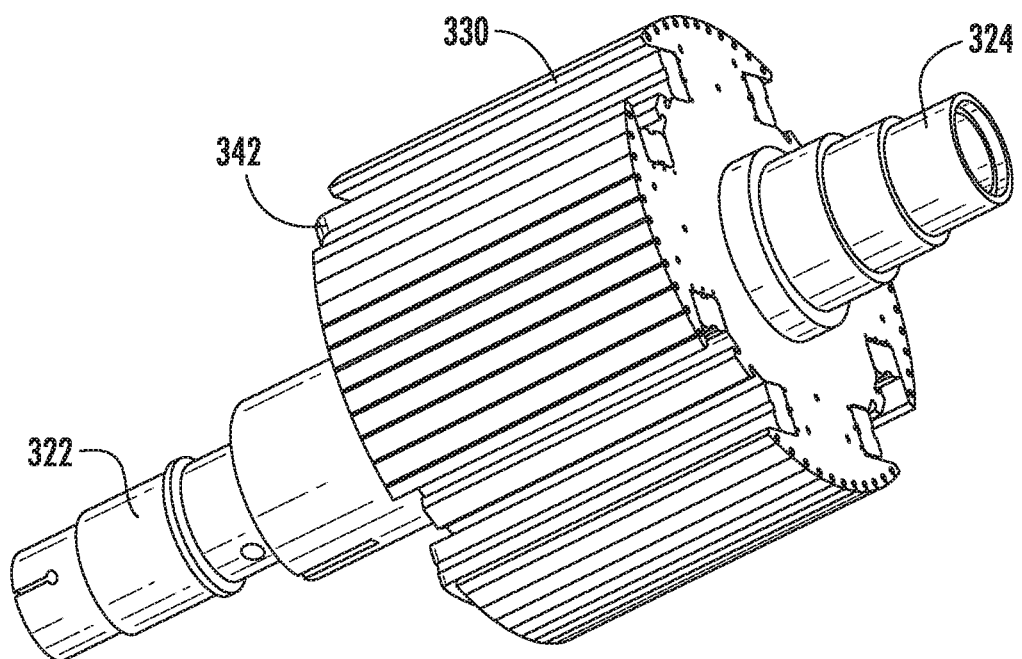
FIG. 14 depicts an example first part of a rotor winding assembled with a rotor core according to example embodiments of the present disclosure.
Figure 15:
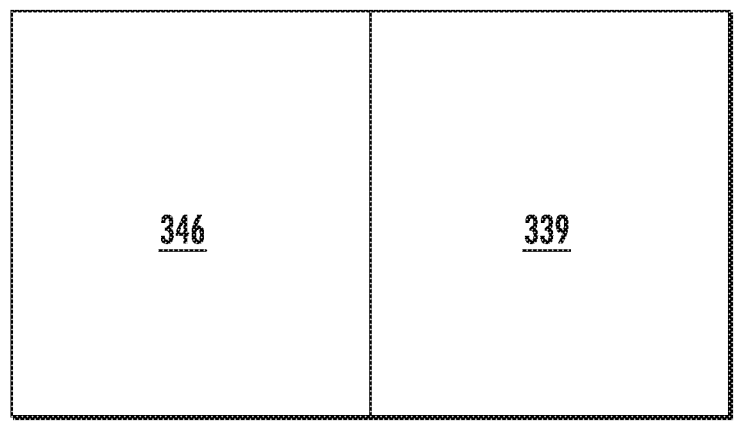
FIG. 15 depicts an example first projection of a rotor core contacting an example second projection of a first part of a rotor winding according to example embodiments of the present disclosure.

Referring to (314) of FIG. 9, the method 300 can include coupling the first part of the rotor winding to the rotor core. FIG. 14 depicts the first part 342 of the rotor winding 340 being coupled to the rotor core 330 according to example aspects of the present disclosure. When the first part 342 of the rotor winding 340 is coupled to the rotor core 330, the first projection 339 contacts the second projection 346 as depicted in FIG. 15. In this way, a position of the first part 342 of the rotor winding 340 relative to the rotor core 330 can be controlled.

Figure 16:
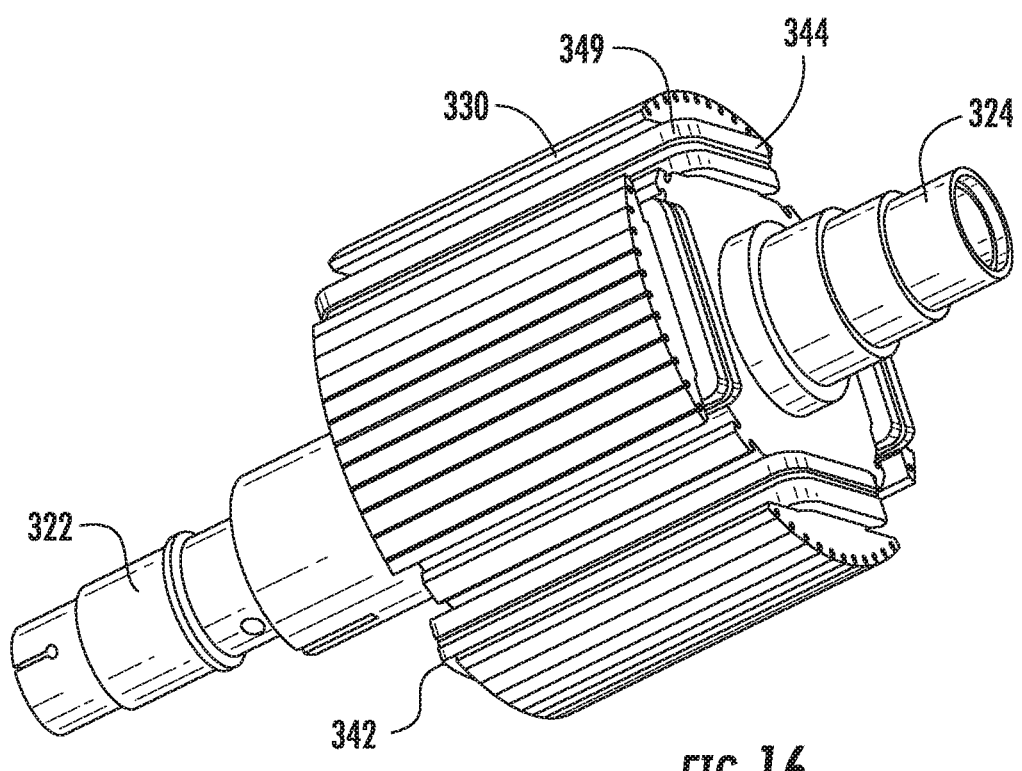
FIG. 16 depicts an example second part of a rotor winding printed onto a first part of the rotor winding according to example embodiments of the present disclosure.

Once the first part of the rotor winding is coupled to the rotor core, the method 300 can include printing, at (316) a second part of the rotor winding onto the first part of the rotor winding 340 to form the rotor assembly. FIG. 16 depicts a second part 344 of the rotor winding 340 printed onto the first part 342 of the rotor winding 340 after coupling the first part 342 of the rotor winding 340 to the rotor core 330. As shown, the second part 344 of the rotor winding 340 can include top end turns 349.

Referring to FIG. 9 at (318), the method 300 can include applying a varnish or epoxy to the rotor assembly. For instance, the rotor assembly can be varnished using a varnish or an epoxy. Alternatively or additionally, the epoxy can be potted. Still further, the varnish or epoxy can be electrophoretically deposited onto the rotor assembly. After applying the varnish or epoxy to the rotor assembly, the method 300 can include, at (319), removing the first projection from the rotor core and the second projection from the first part of the rotor winding. In addition, spaces can be filled with insulation and/or electrical leads can be attached. In some embodiments, as shown in FIG. 16, accessories such as end caps 352, retaining rings 354, and/or cooling components 356 can be assembled to the rotor core 330 to complete the rotor assembly 350.

Figure 17:
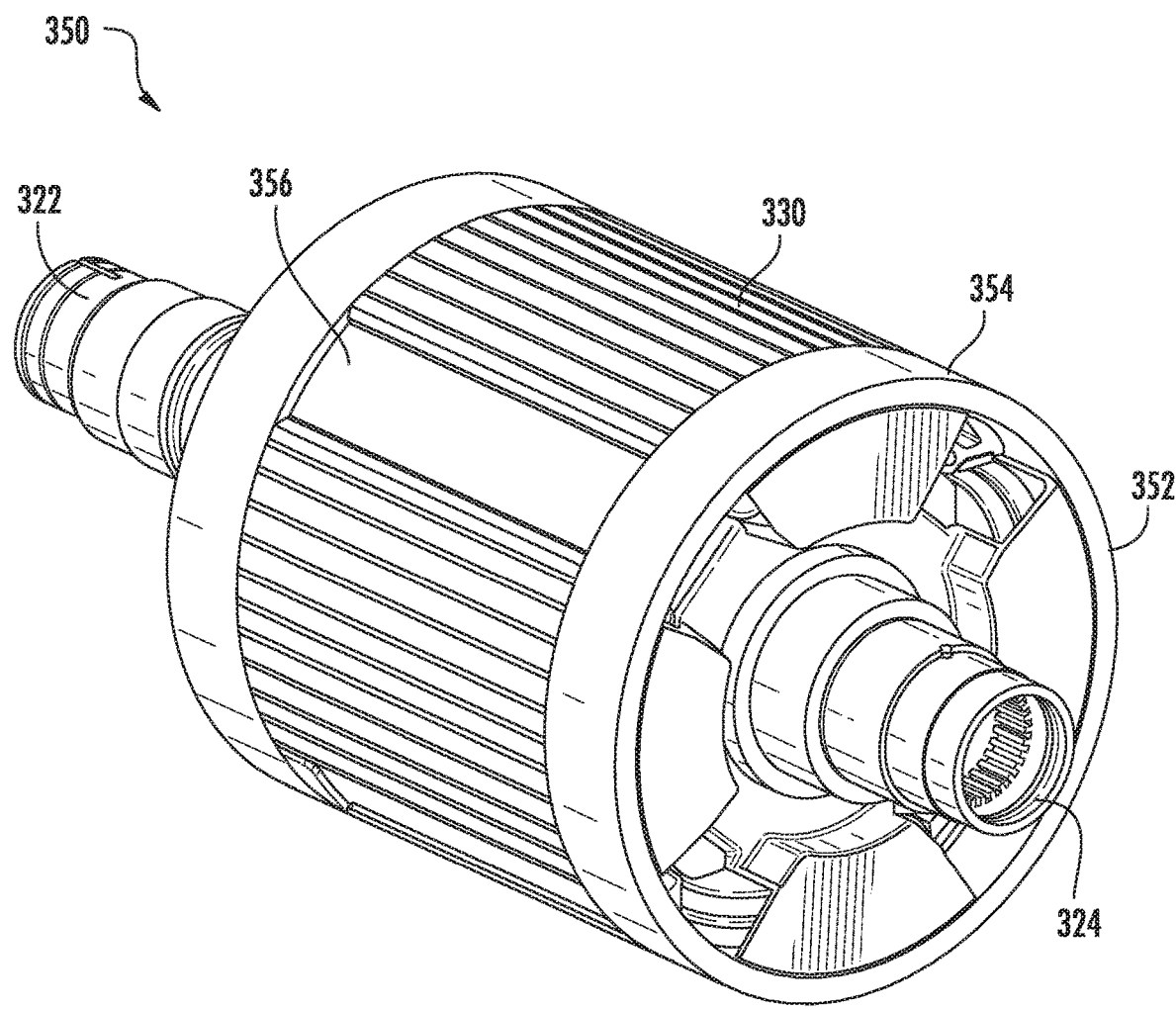
FIG. 17 depicts a rotor assembly printed according to example embodiments of the present disclosure.
Figure 18:
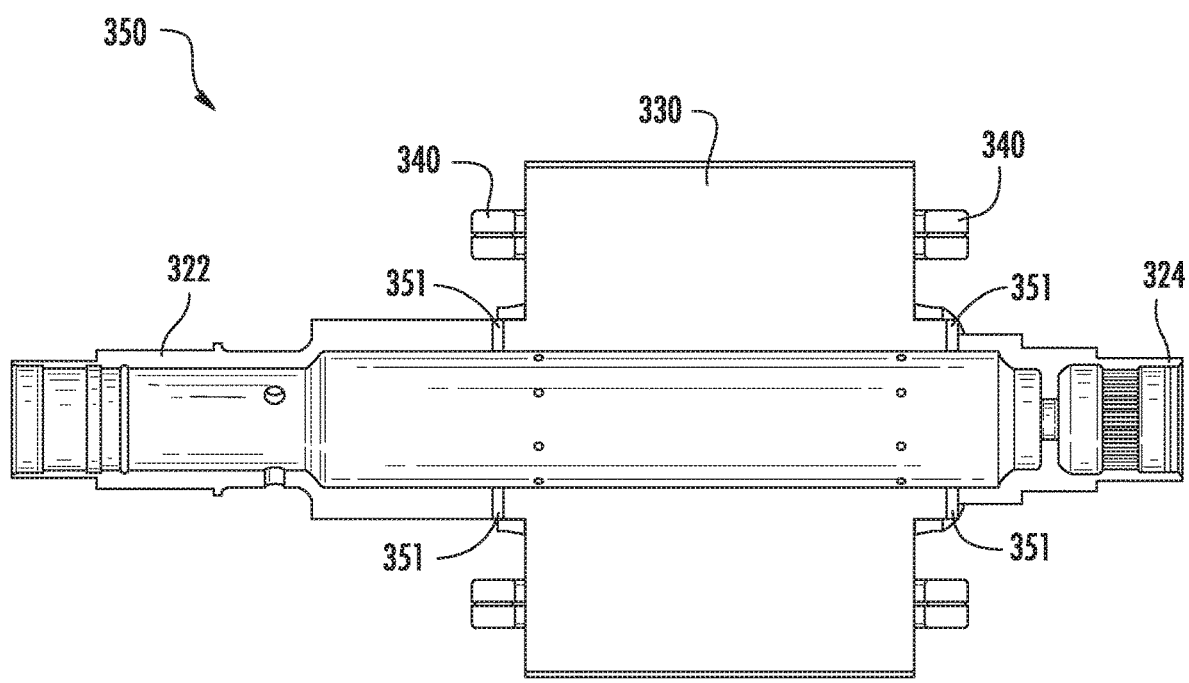
FIG. 18 depicts a cross-sectional view of a rotor core printed according to example embodiments of the present disclosure.
Figure 19:
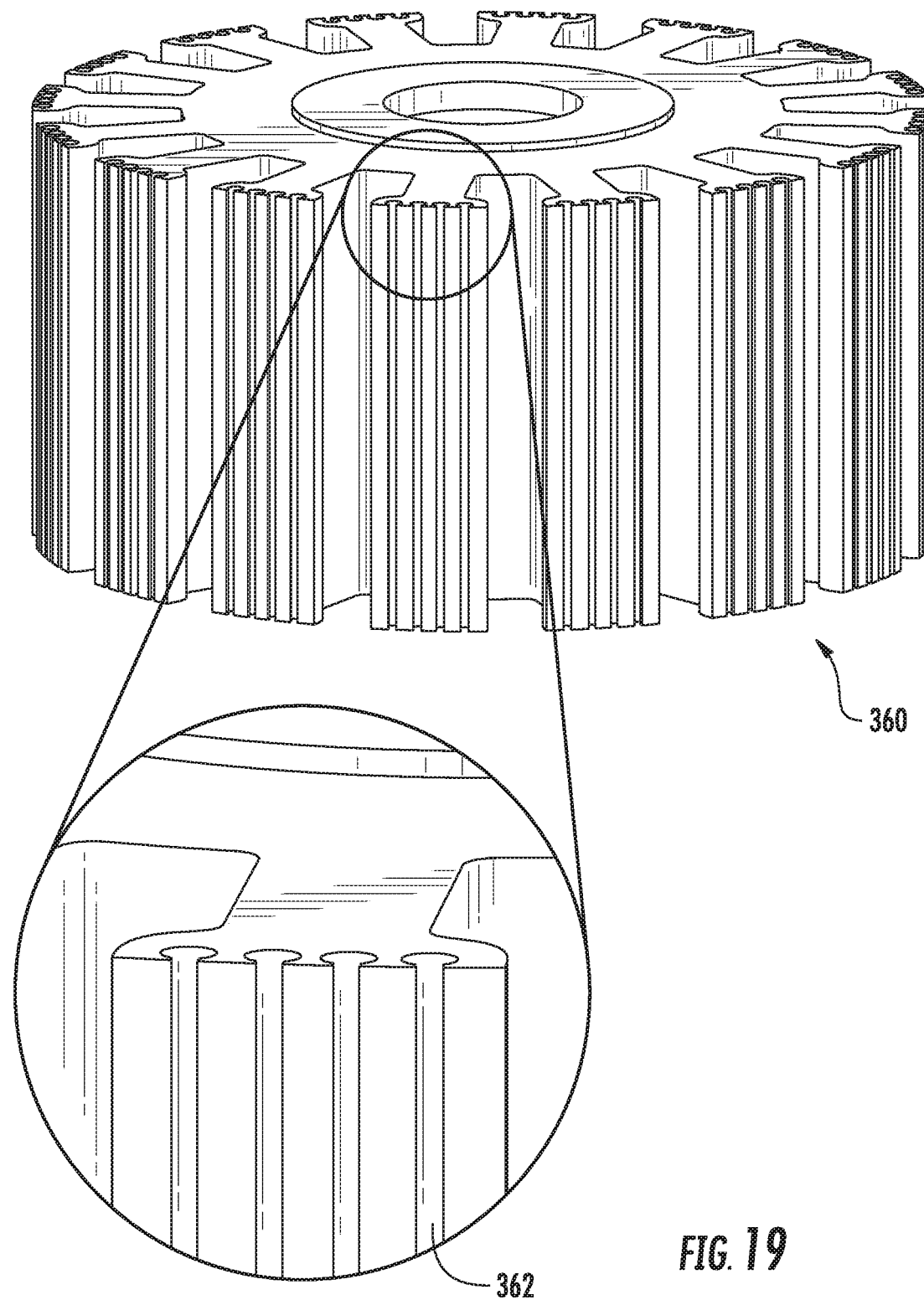
FIG. 19 depicts a rotor core printed according to example embodiments of the present disclosure.
Figure 20:
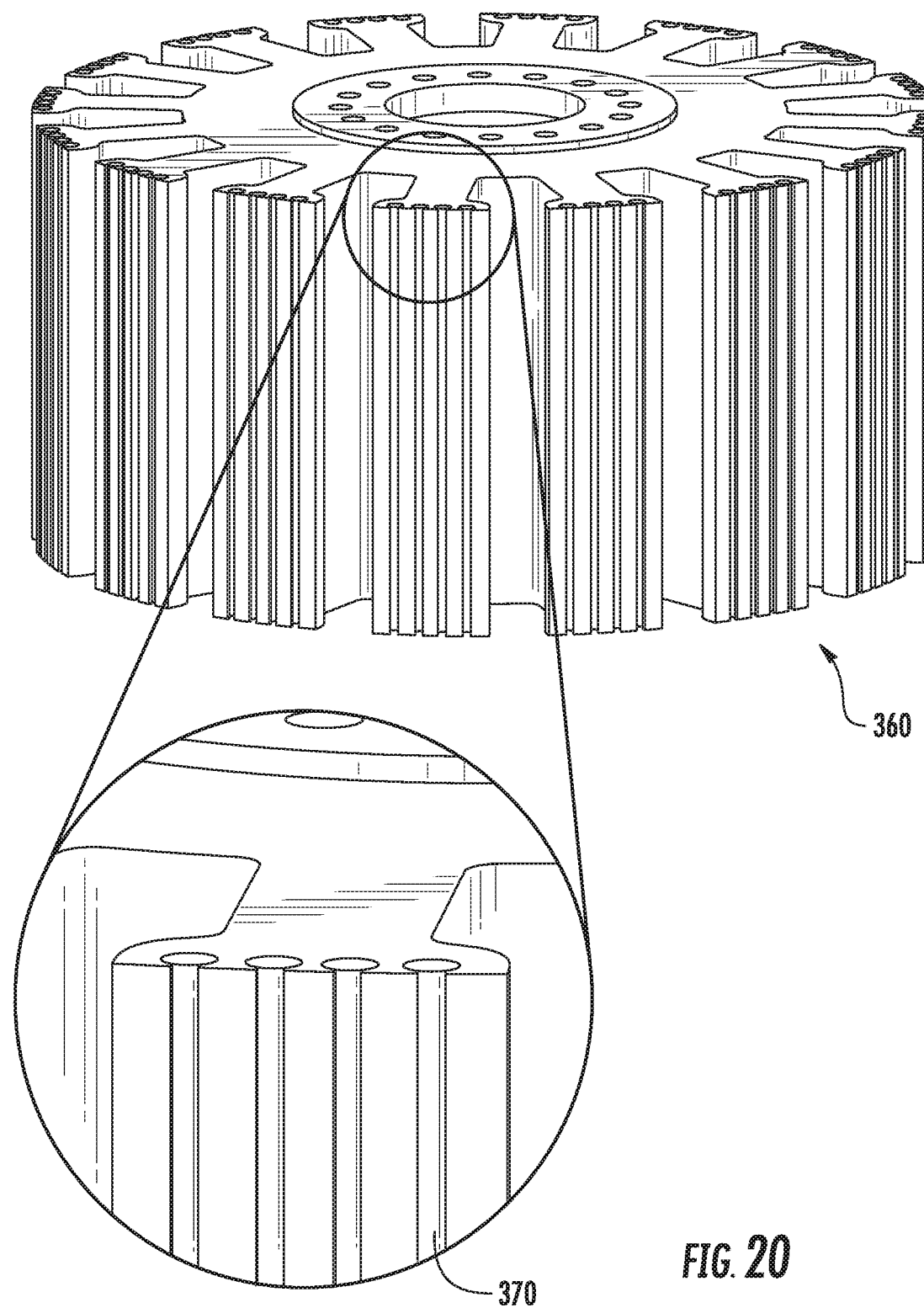
FIG. 20 depicts a plurality of damp bars coupled to a rotor core according to example embodiments of the present disclosure.
Figure 21:
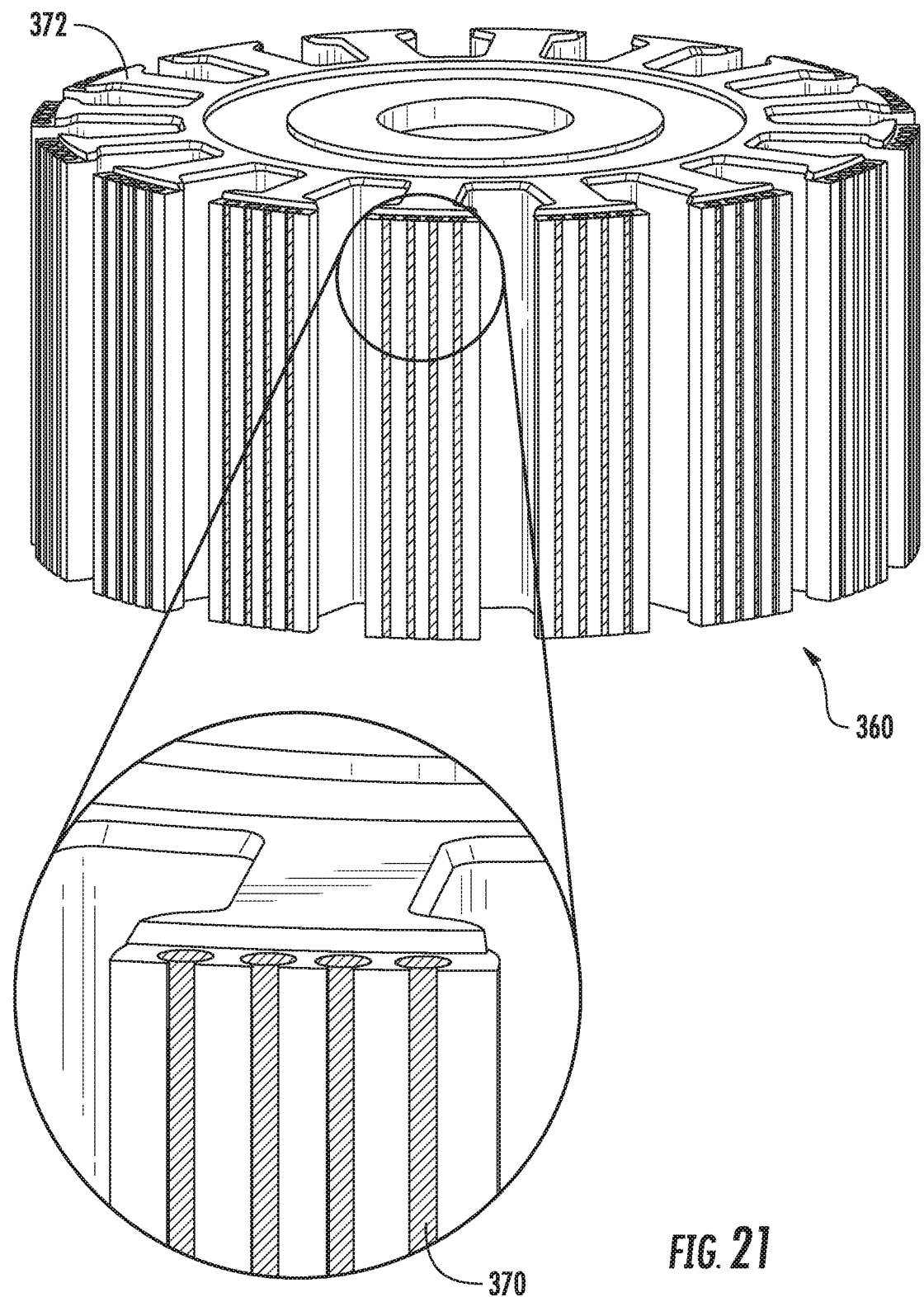
FIG. 21 depicts a damp ring coupled to the rotor core of FIG. 18 according to example embodiments of the present disclosure.
Figure 22:
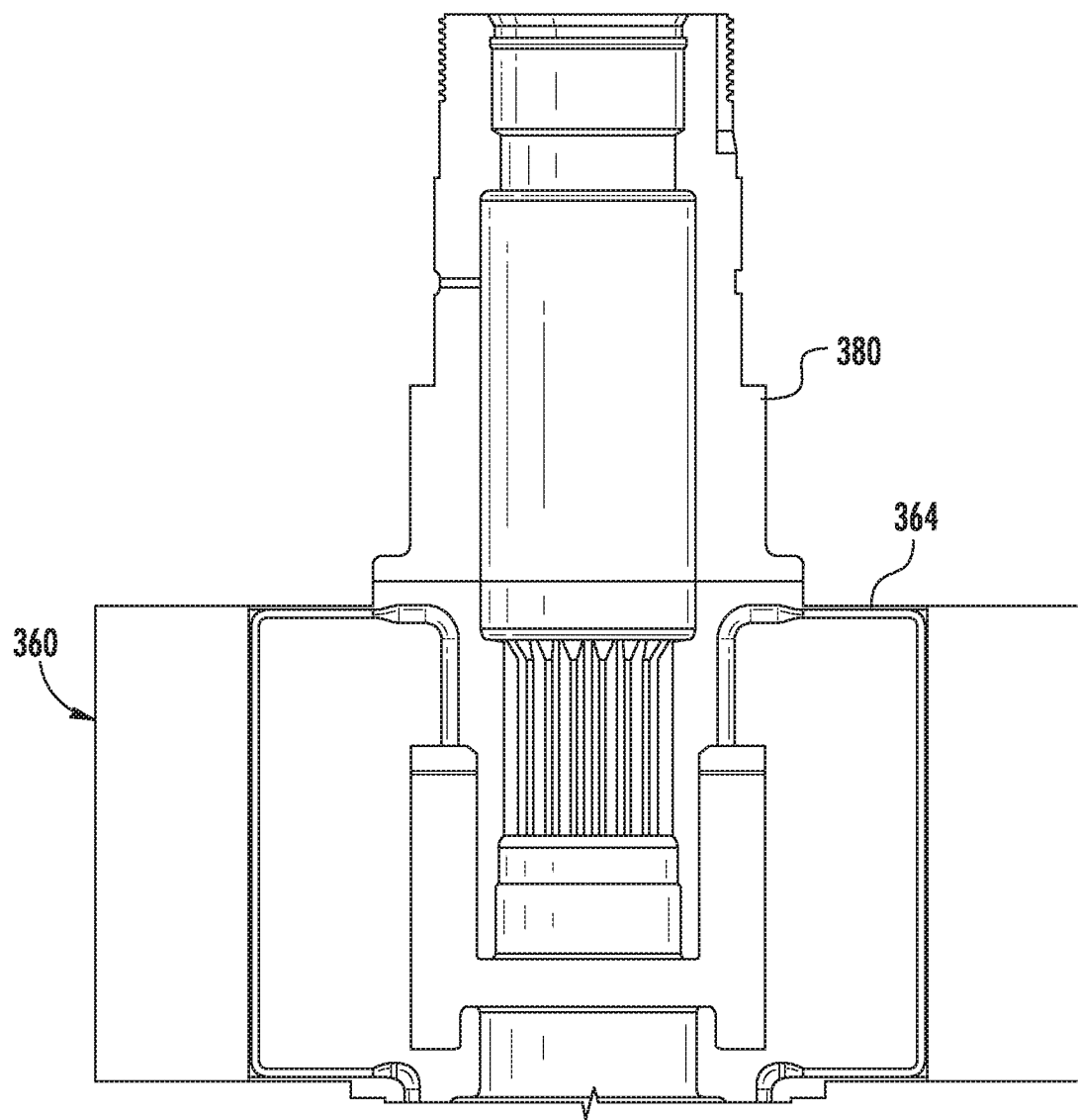
FIG. 22 depicts a first part of a rotor shaft printed onto a rotor core according to example embodiments of the present disclosure.
Figure 23:
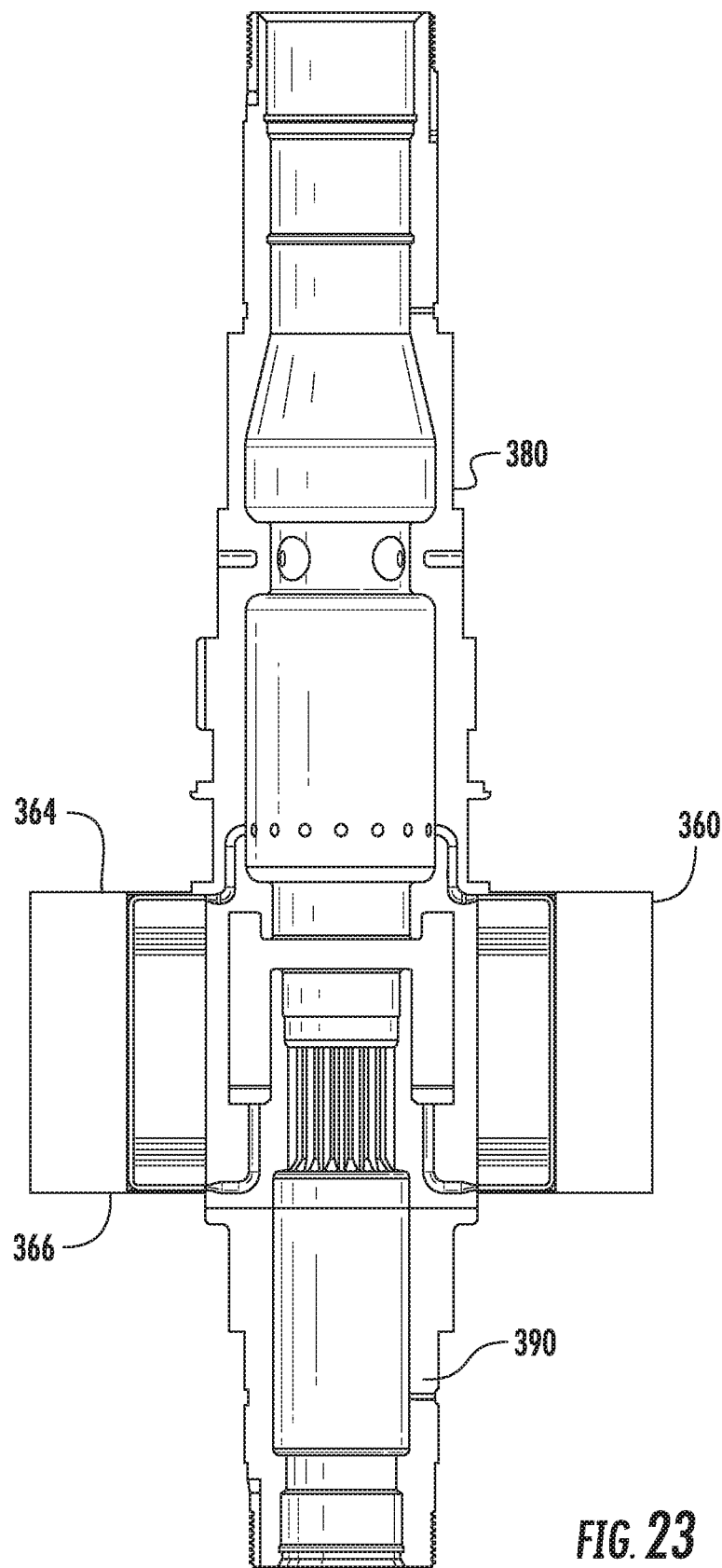
FIG. 23 depicts a second part of a rotor shaft printed onto a rotor core according to example embodiments of the present disclosure.
Figure 24:
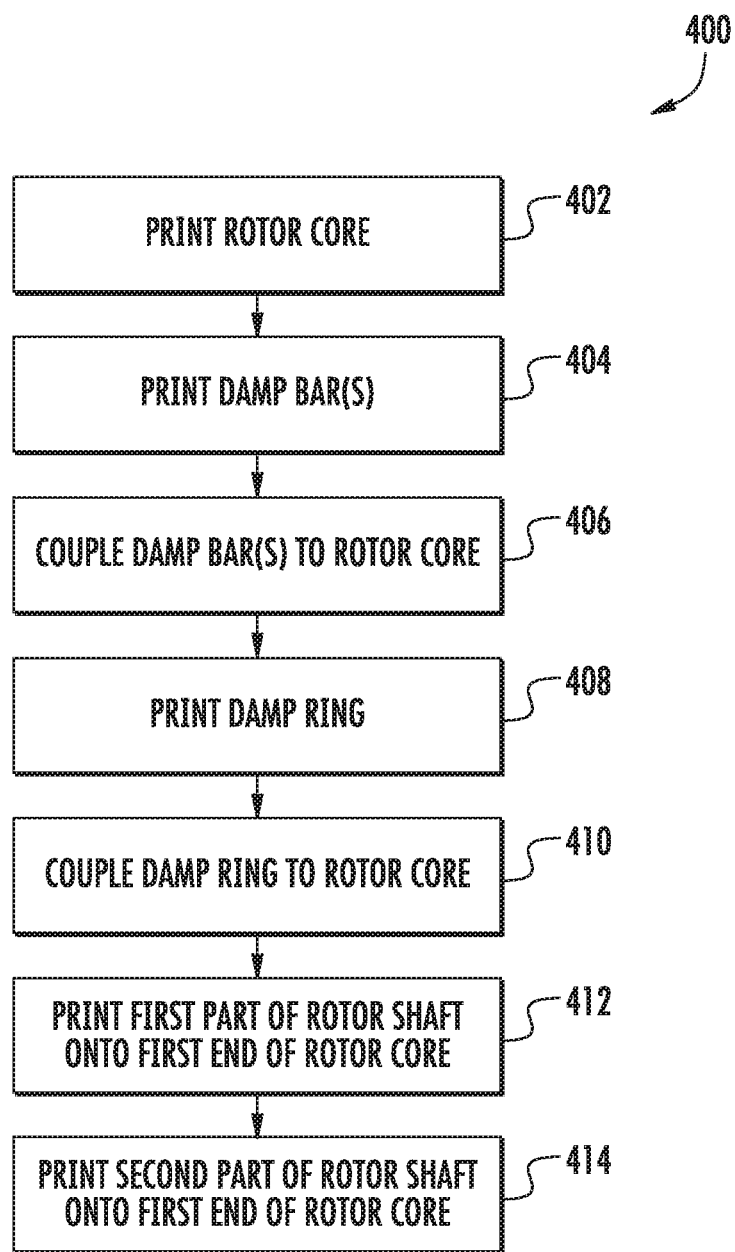
FIG. 24 depicts a flow diagram of an example method for manufacturing a rotor assembly according to example embodiments of the present disclosure.

Variations and modifications can be made to the rotor assembly 350 without deviating from the scope of the present disclosure. For instance, as shown in FIG. 17, wet cavity oil spray nozzles 351 can be printed as part of the rotor core 330 for use in wet cavity electrical machines.

FIGS. 19 through 24 depict another example method 400 for manufacturing a rotor assembly for an electrical machine. At (402), the method 400 can include printing a rotor core 360. The rotor core 360 can be printed of any suitable material. For instance, the rotor core 360 can be printed using an iron-cobalt-vanadium soft magnetic alloy (e.g. Hiperco50 Alloy).

At (404), the method 400 can include printing at least one damp bar 370. The at least one damp bar 370 can be printed from any suitable material. In addition, the method 400 can include, at (406), coupling the at least one damp bar 370 to the rotor core 330. In example embodiments, coupling the at least one damp bar 370 to the rotor core 330 comprises inserting the at least one damp bar 370 into one of a plurality of slots 362 defined by the rotor core 360.

At (408), the method 400 can include printing a damp ring 372. The damp ring 372 can be printed from any suitable material. In addition, the method 400 can include, at (410) coupling the damp ring 372 to the rotor core 360. In example embodiments, the damp ring 372 can be positioned on a first end 364 of the rotor core 360. In alternative embodiments, however, the damp ring 372 can be positioned on a second end 366 of the rotor core 360. In particular, the second end 366 can be spaced apart from the first end 364 along a length L of the rotor core 360.

At (412), the method 400 can include printing a first part 382 of a rotor shaft 380 onto the first end 364 of the rotor core 360. In addition, the method 400 can include, at (414), printing a second part 384 of the rotor shaft 380 onto the second end 366 of the rotor core 360 to form the rotor assembly.

Figure 25:
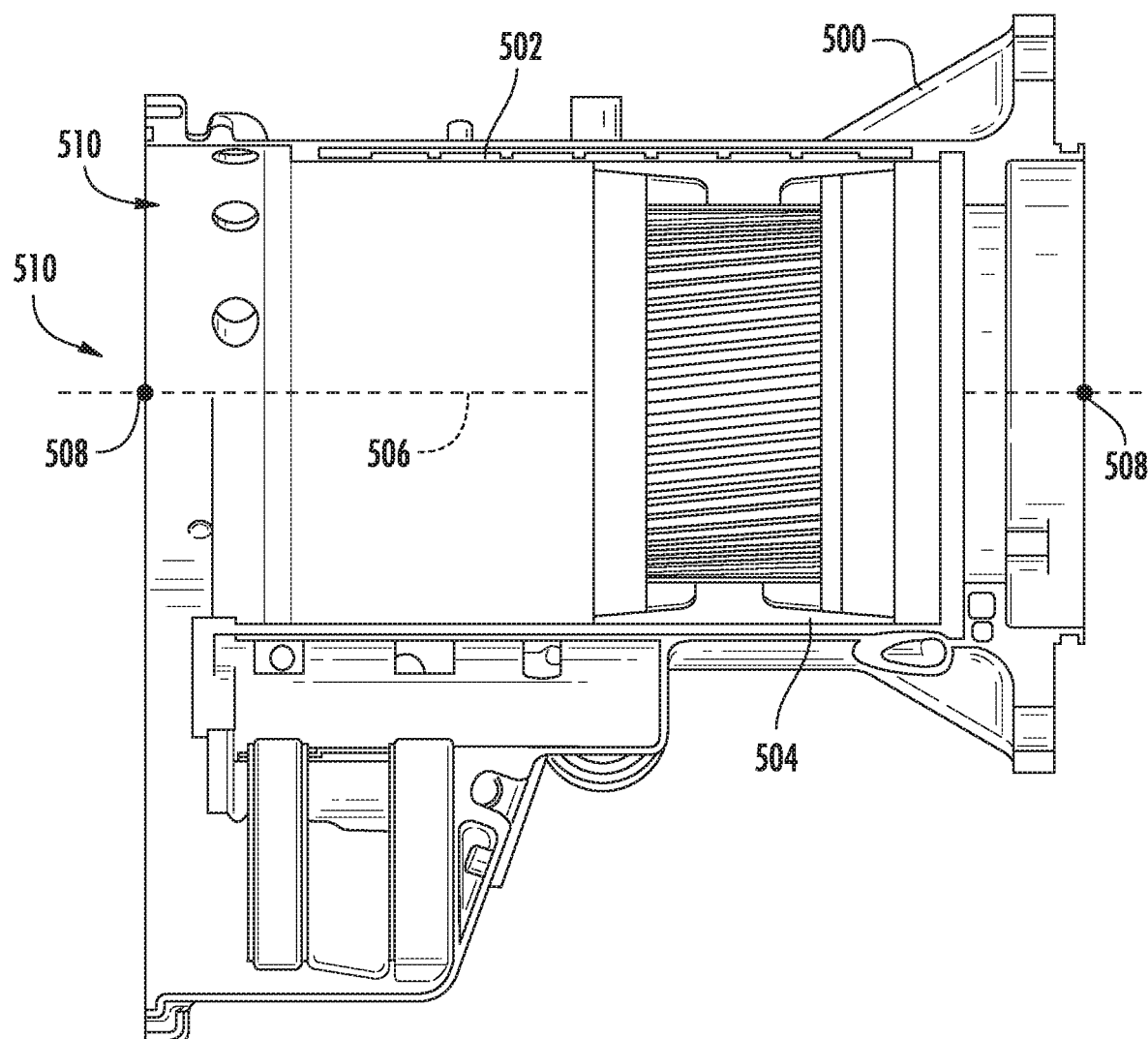
FIG. 25 depicts an example housing with an integrated cooling jacket printed according to example embodiments of the present disclosure.

Referring now to FIG. 25, example embodiments of the present disclosure are directed to printing a housing for the electrical machine to house and support the various components of the electrical machine, such as a stator assembly printed according to example embodiments of the present disclosure and/or the rotor assembly printed according to example embodiments of the present disclosure.

FIG. 25 depicts an example housing 500 printed according to example embodiments of the present disclosure. As shown, the housing 500 defines a cavity 510. In particular, the cavity 510 is configured to house various components of an electrical machine, such as one or more stators, one or more rotors, CTs, rotating rectifiers, etc. In example embodiments, the housing 500 can be printed layer by layer perpendicular to a centerline 506 extending through each bearing center of a pair of bearing centers 508.

Furthermore, since additive manufacturing is used, the housing 500 can be printed with a cooling jacket 502 so that the housing 500 and the cooling jacket 502 can be integral with one another. Integrally printing the housing 500 with the cooling jacket 502 can allow for the elimination of various components (e.g., seals) that would typically be a part of the electrical machine housing. In addition, the cooling jacket 502 can define one or more passages for a fluid (e.g., oil) to pass therethrough. In particular, the one or more passages can include an oil circuit or a sump. The housing 500 can include other components for housing the various components, such as a structure 504 for housing a stator assembly for the electrical machine.

In example embodiments, the cooling jacket 502 can be printed contemporaneously with at least a portion of the housing 500.

Once the housing 500 has been printed according to example embodiments of the present disclosure, the method can include assembling various components to form an electrical machine. For instance, the stator assembly, rotor assembly, and other components can be assembled with the housing 500 to form an electrical machine.

Figure 26:
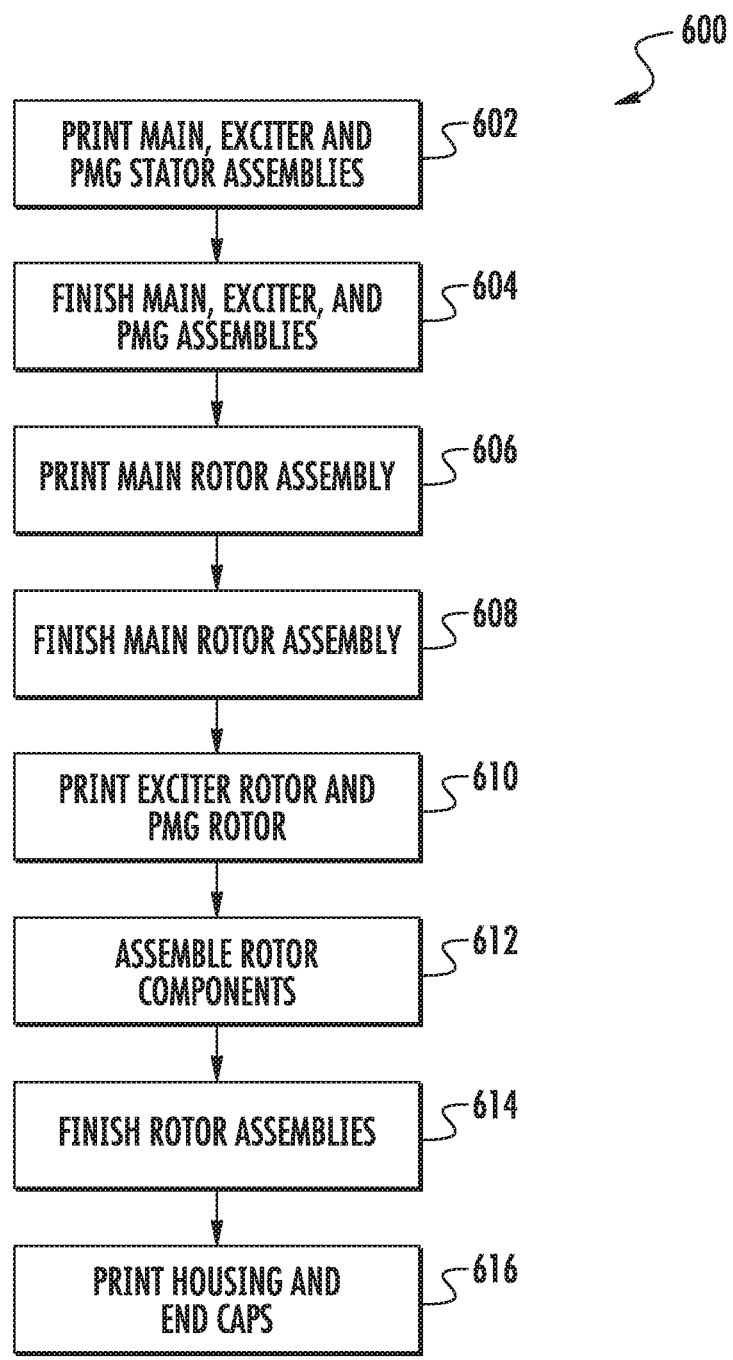
FIG. 26 depict a flow diagram of an example method for assembly an electrical machine according to example embodiments of the present disclosure.
Figure 27:
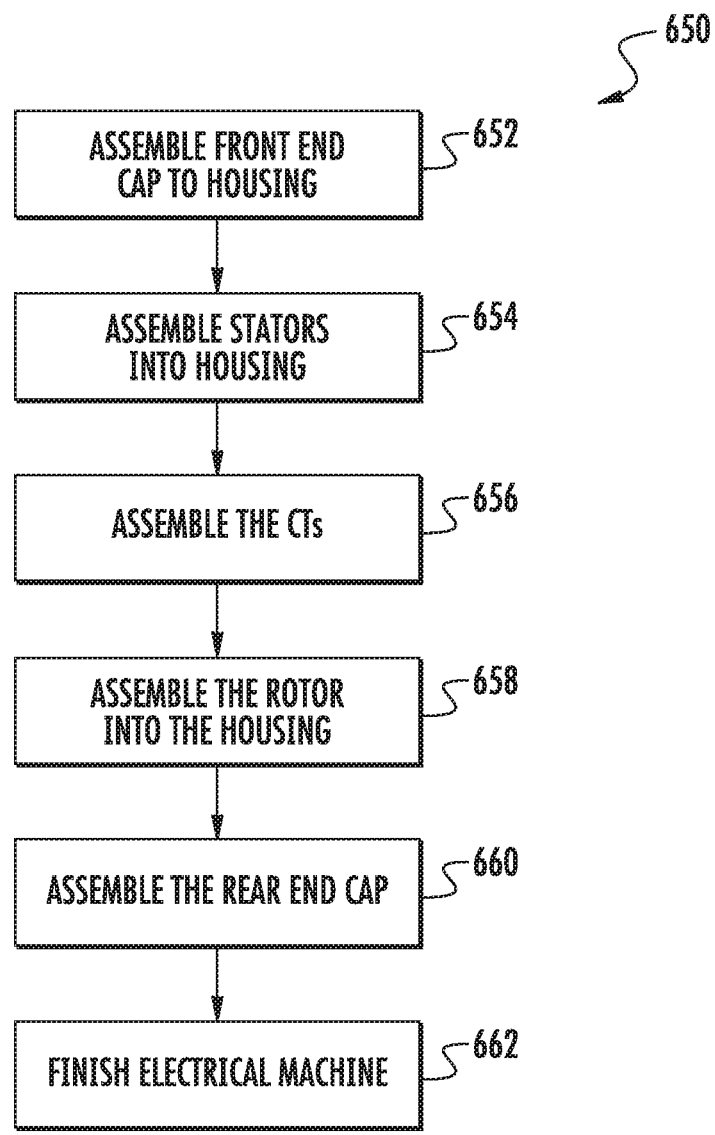
FIG. 27 depict a flow diagram of an example method for assembling an electrical machine according to example embodiments of the present disclosure

FIGS. 26 and 27 depict a flow diagram of an example method for manufacturing an electrical machine including a main stator, an exciter stator, and a PMG stator for use in, for instance, aircraft or other avionic applications. FIG. 26 depicts a flow diagram of an example method (600) for manufacturing various components (e.g., stator assemblies, rotor assemblies, etc.) for use in the electrical machine. At (602), the method 600 can include printing main, exciter, and PMG stator assemblies for the electrical machine. The stator assemblies can be printed, for instance, using the method discussed with reference to FIG. 2.

At (604), the method 600 can include applying a varnish or epoxy to the main, exciter, and PMG stator assemblies. For instance, the stator assemblies can be varnished using a varnish or an epoxy. Alternatively or additionally, the stator assemblies can be potted (e.g., with epoxy) or deposited. After applying the varnish or epoxy to the stator assemblies, a first projection, such as the first projection 229 discussed above with reference to FIG. 4, can be removed from a stator core for each of the stator assemblies. In addition, a second projection, such as the second projection 236 discussed above with reference to FIG. 5, can be removed from a first part of a stator winding for each of the stator assemblies. After removing the first and second projections, spaces can be filled with insulation and/or electrical leads can be attached.

At (606), the method can include printing a main rotor assembly. The main rotor assembly can be printed, for instance, using the method discussed with reference to FIG. 8. Alternatively, the main rotor assembly can be printed, for instance, using the method discussed above with reference to FIG. 24.

At (608), a varnish or epoxy can be applied to the main rotor assembly. After applying the varnish or epoxy to the rotor assembly, a first projection, such as the first projection 339 discussed above with reference to FIG. 12, can be removed from a rotor core of the main rotor assembly. In addition, a second projection, such as the second projection 346 discussed above with reference to FIG. 13, can be removed from a first part of a rotor winding of the main rotor assembly. After removing the first and second projections, spaces can be filled with insulation and/or electrical leads can be attached.

At (610), the method can include printing the exciter and PMG rotor assemblies. The exciter rotor assembly can be printed for instance, using the method discussed with reference to FIG. 9. The PMG rotor can be printed according to example aspects with the present disclosure with slots for permanent magnets.

At (612), the method can include assembling the rotor components. For instance, the exciter and PMG rotor can be assembled together. Various components associated with the rotor(s) can be assembled, such as a rotating rectifier, bearings, seals, etc.

At (614), the exciter and PMG rotor assemblies can be finished. For instance, varnish or epoxy can be applied to each of the exciter and PMG rotor assemblies; spaces can be filled with insulation; and electrical leads can be attached.

At (616), the method can include printing a housing for the stator assemblies and rotor assemblies associated with the electrical machine. In some embodiments, the housing can have an integrated cooling jacket and other components for housing the stator assemblies and rotor assemblies. End caps, retaining rings, and other components of the electrical machine can also be printed.

FIG. 27 depicts a flow diagram of an example method 650 of assembling the various printed components together to form an electrical machine according to example embodiments of the present disclosure. At (652), the method 650 can include assembling or coupling a front end cap to the housing. The main, exciter, and PMG stators can then be assembled into the housing at (654).

At (656), the method 650 can include assembling the CTs. The main rotor assembly as well as the exciter rotor and PMG rotor assembly can be assembled into the housing (658). The rear end cap can be assembled onto the housing (660). At (662), the electrical machine can be finished. For instance, appropriate electrical connections can be included in the electrical machine. In this way, an electrical machine can be manufactured using 3D printing technology that provides many advantages over typical methods of manufacturing electrical machines.

Figure 28:
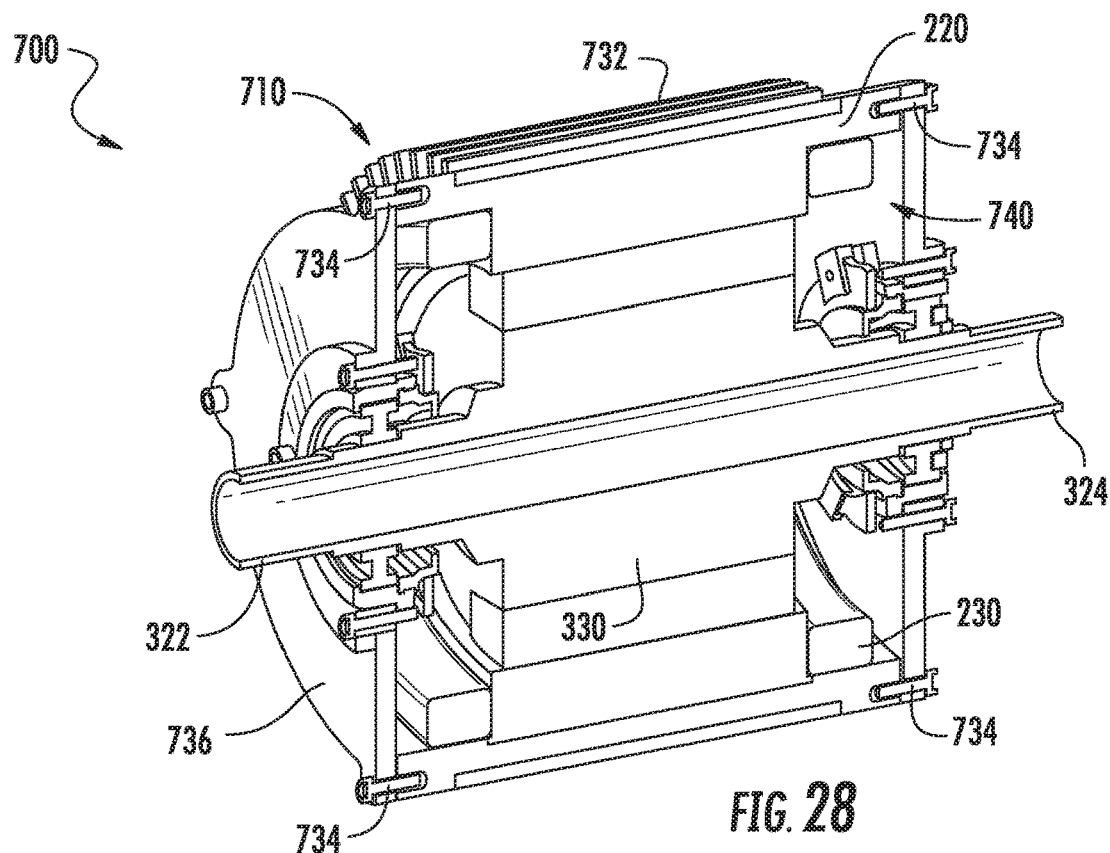
FIG. 28 depicts a cross-sectional, perspective view of an example stator housing according to example embodiments of the present disclosure.
Figure 29:
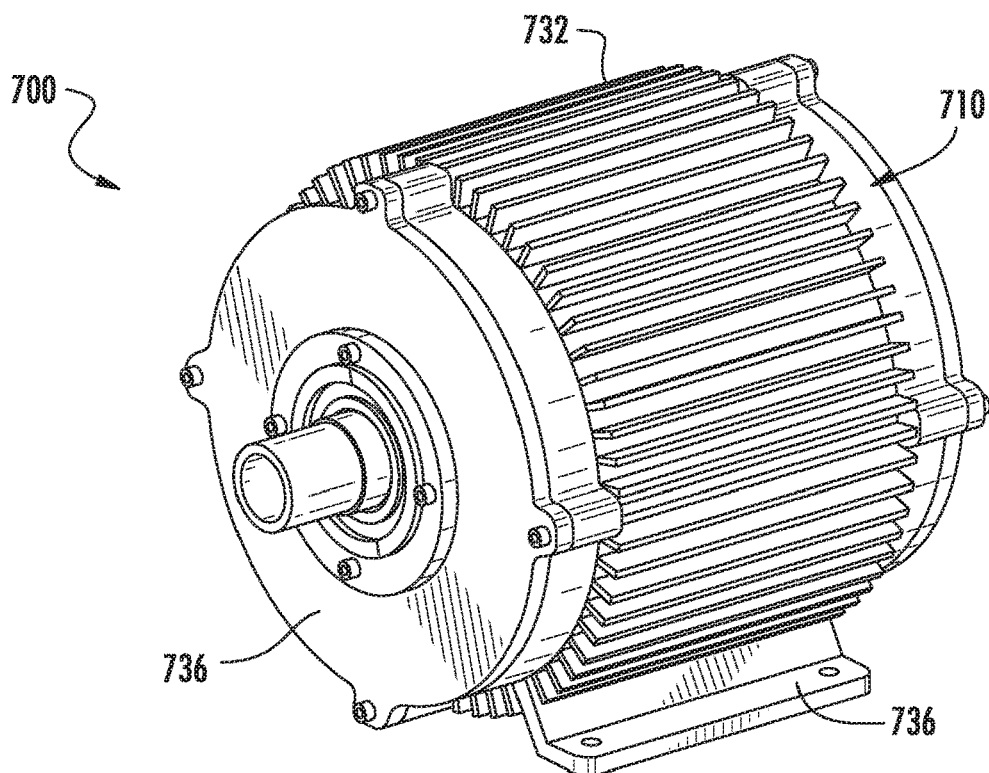
FIG. 29 depicts a perspective view of an example stator housing according to example embodiments of the present disclosure.

Variations and modifications can be made to the example embodiments disclosed herein. For instance, in some embodiments, an electrical machine can be printed as a stand-alone unit. The electrical machine can be printed according to example embodiments of the present disclosure and can include various features. For instance, a housing 710 for an electrical machine 700 can be printed as part of the lamination sheets when printing a stator core according to example embodiments of the present disclosure. For example, as shown in FIGS. 28 and 29, at least one air cooling fin 732 can be printed as part of the housing 710 that is printed when printing the stator core 220. Alternatively or additionally, at least one mounting ear 734 can be printed as part of the housing 710. In example embodiments, the at least one air cooling fin 732 and/or the mounting ear 734 can be printed when printing the stator core 220. More specifically, the air cooling fin 732 and/or the mounting ear 734 can be printed as part of the stator core 220. In example embodiments, printing the mounting ear 734 can occur contemporaneously with printing the housing 710. More specifically, the mounting ear 734 can be integral with the housing 710. Alternatively or additionally, at least one end cap 736 can be printed as part of the housing 710. Furthermore, when manufacturing the housing 710, the end cap 736 can be coupled to the housing 710 via the mounting ear 734. When the end cap 736 is coupled to the housing 710 via the mounting ear 734, a cavity 740 defined by the housing 710 can be enclosed. In example embodiments, a first end cap can be coupled to the housing 710 via a first pair of mounting ears positioned at a first end of the housing 710. In addition, a second end cap can be coupled to the housing 710 via a second pair of mounting ears positioned at a second end of the housing 710. In particular, the second end can be spaced apart from the first end along a length of the housing 710. When the stator assemblies and rotor assemblies are coupled to one another and disposed within the cavity 740, the end cap 736 can, in effect, seal the stator and rotor assemblies from an external environment.

Figure 30:
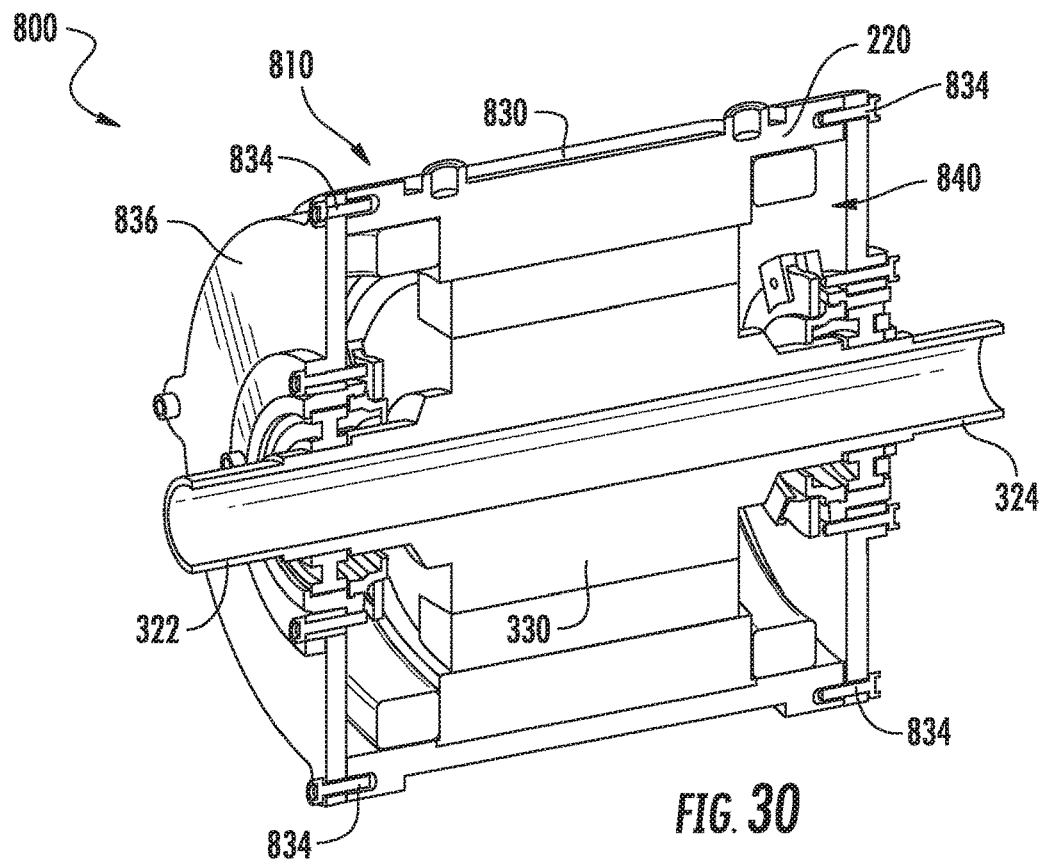
FIG. 30 depicts a cross-sectional, perspective view of an example stator housing according to example embodiments of the present disclosure.
Figure 31:
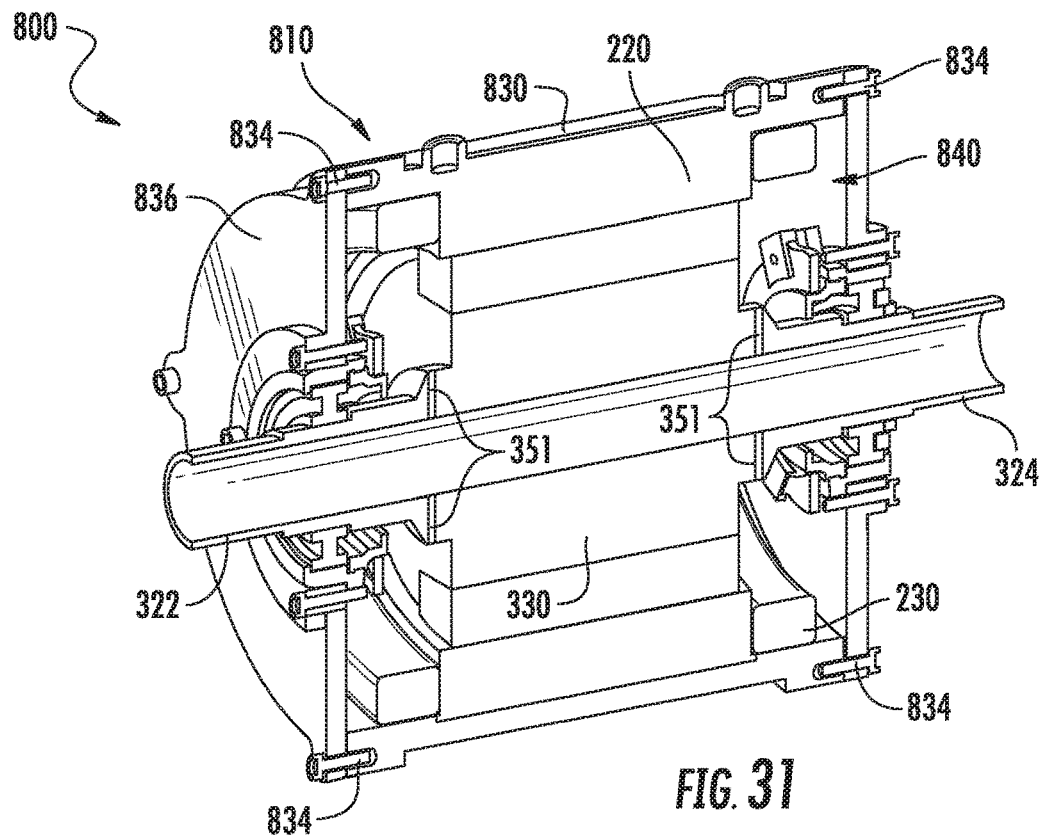
FIG. 31 depicts a cross-sectional, perspective view of an example stator housing according to example embodiments of the present disclosure.
Figure 32:
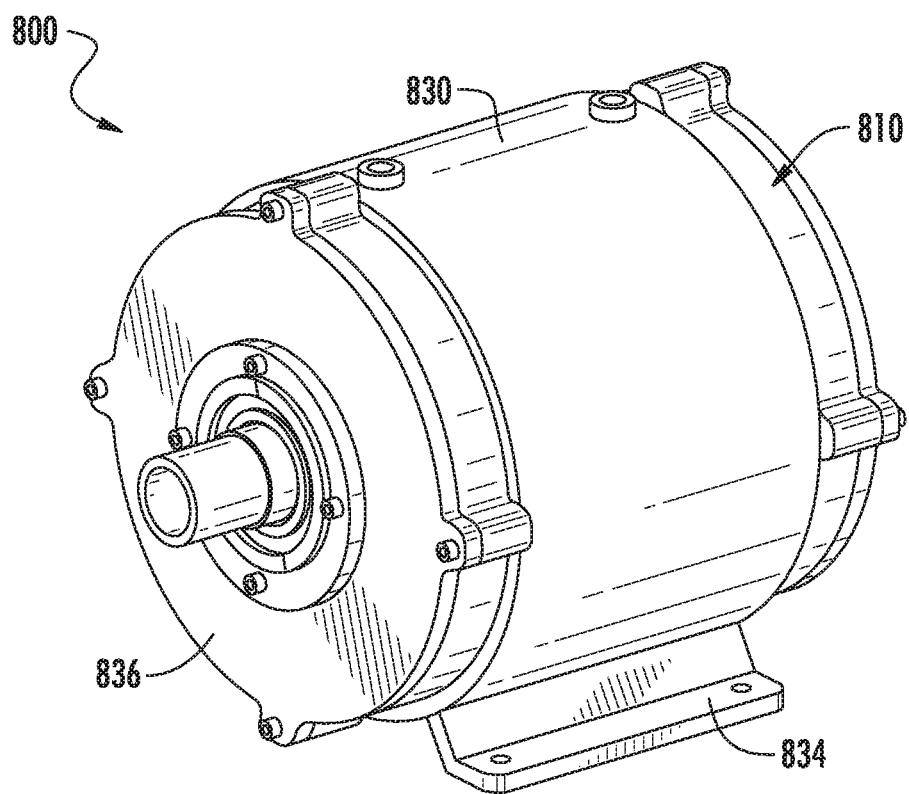
FIG. 32 depicts a perspective view of an example stator housing according to example embodiments of the present disclosure.

FIGS. 30 through 32 depict another example embodiment of an electrical machine that can be printed according to example embodiments of the present disclosure. For example, a housing 810 for an electrical machine 800 can include a cooling jacket 830. Alternatively or additionally, the housing 810 can include at least one mounting ear 834. Alternatively or additionally, the housing 810 can include at least one end cap 836. More specifically, the cooling jacket 830, mounting ear 834 and/or the end cap 836 can be printed as part of the stator core 220. In this way, the cooling jacket 830, mounting ear 834 and/or the end cap 836 can be integral with the stator core 220. In some embodiments, features associated with the cooling jacket 830 and/or the mounting ear 834 can be printed as part of the lamination sheets when printing the stator core 220. For example, printing the cooling jacket 830 can include printing the cooling jacket 830 so that the cooling jacket 830 defines one or more passages for a fluid to pass therethrough. In particular, the one or more passages can include an oil circuit for oil to pass therethrough. Alternatively or additionally, the one or more passages can include a sump for oil to pass therethrough. It should be appreciated, however, that any suitable fluid can be passed through the oil circuit and the sump.

As shown, the housing 810 defines a cavity 840 configured to accommodate at least the stator core 220 and the rotor core 330. In example embodiments, the cavity 840 can be in fluid communication with the one or more wet cavity spray nozzles 351 defined by the rotor core 330. In this way, a fluid exiting the wet cavity spray nozzle(s) 351 can enter the cavity 840. As such, the printed electrical machine depicted in FIG. 31 is a wet cavity electrical machine. In contrast, the printed electrical machine depicted in FIG. 30 is a dry cavity electrical machine, because the rotor core 330 does not include one or more wet cavity spray nozzles 351.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor assembly for an electrical machine, the method comprising:
   printing a first part of a rotor shaft;
   printing a rotor core onto the first part of the rotor shaft;
   printing a second part of the rotor shaft onto the rotor core;
   printing a first part of a rotor winding;
   coupling the first part of the rotor winding to the rotor core; and
   after coupling the first part of the rotor winding to the rotor core, printing a second part of the rotor winding onto the first part of the rotor winding to form the rotor assembly.

2. The method of claim 1, wherein printing the first part of the rotor shaft comprises printing the first part of the rotor shaft using a first material, and wherein printing the rotor core comprises printing the rotor core using a second material that is different than the first material.

3. The method of claim 1, wherein printing the rotor core comprises:
   printing a first lamination sheet;
   printing at least one spacer after printing the first lamination sheet; and
   printing a second lamination sheet after printing the at least one spacer,
   wherein the at least one spacer is positioned between the first lamination sheet and the second lamination sheet.

4. The method of claim 3, wherein the at least one spacer is formed from a first material having a high resistivity relative to a second material that is used to form the both the first lamination sheet and the second lamination sheet.

5. The method of claim 1, wherein printing the rotor core comprises printing a first projection, wherein printing the first part of the rotor winding comprises printing a second projection, and wherein the first projection contacts the second projection when the first part of the rotor winding is coupled to the rotor core.

6. The method of claim 5, further comprising:
   applying a varnish or epoxy to the rotor assembly;
   removing the first projection from the rotor core after applying the varnish or epoxy; and
   removing the second projection from the first part of the rotor winding after applying the varnish or epoxy.

7. The method of claim 6, wherein applying the varnish or epoxy to the rotor assembly comprises potting the epoxy to the rotor assembly.

8. The method of claim 6, wherein applying the varnish or epoxy to the rotor assembly comprises electrophoretically depositing the varnish or epoxy onto the rotor assembly.

9. A method for manufacturing an electrical machine, the method comprising:
   printing, by a three-dimensional (3D) printing process, a stator assembly;
   printing, by the 3D printing process, a first part of a rotor shaft;
   printing, by the 3D printing process, a rotor core onto the first part of the rotor shaft;
   printing, by the 3D printing process, a second part of the rotor shaft onto the rotor core;
   printing, by the 3D printing process, a first part of a rotor winding;
   coupling the first part of the rotor winding to the rotor core; and
   after coupling the first part of the rotor winding to the rotor core, printing, by the 3D printing process, a second part of the rotor winding onto the first part of the rotor winding to form a rotor assembly,
   wherein the 3D printing process comprises fusing metal using laser energy or heat.

10. The method of claim 9, further comprising printing, by the 3D printing process, a housing defining a cavity.

11. The method of claim 9, wherein printing the first part of the rotor shaft comprises printing, by the 3D printing process, the first part using a first material, and wherein printing the rotor core comprises printing, by the 3D printing process, the rotor core using a second material that is different than the first material.

12. The method of claim 9, wherein printing the rotor core comprises:
   printing a first lamination sheet;
   printing at least one spacer after printing the first lamination sheet; and
   printing a second lamination sheet after printing the at least one spacer,
   wherein the at least one spacer is positioned between the first lamination sheet and the second lamination sheet.

13. The method of claim 12, wherein the at least one spacer is formed from a first material having a high resistivity relative to a second material that is used to form the first and second lamination sheets.

14. The method of claim 9, wherein printing the rotor core comprises printing, by the 3D printing process, a first projection, wherein printing the first part of the rotor winding comprises printing, by the 3D printing process, a second projection, and wherein the first projection contacts the second projection contact when the first part of the rotor winding is coupled to the rotor core.

15. The method of claim 14, further comprising:
   applying a varnish or epoxy to the rotor assembly;
   removing the first projection from the rotor core after applying the varnish or epoxy; and removing the second projection from the first part of the rotor winding after applying the varnish or epoxy.

16. The method of claim 15, wherein applying the varnish or epoxy to the rotor assembly comprises potting the epoxy to the rotor assembly.

17. The method of claim 15, wherein applying the varnish or epoxy to the rotor assembly comprises electrophoretically depositing the varnish or epoxy onto the rotor assembly.

18. A method for manufacturing a rotor assembly for an electrical machine, the method comprising:
   printing a rotor core;
   printing a first part of a rotor shaft onto a first end of the rotor core;
   printing a second part of the rotor shaft onto a second end of the rotor core;
   printing a first part of a rotor winding;
   coupling the first part of the rotor winding to the rotor core; and
   after coupling the first part of the rotor winding to the rotor core, printing a second part of the rotor winding onto the first part of the rotor winding to form the rotor assembly.

19. The method of claim 18, wherein printing the rotor core comprises:
   printing at least one damp bar; and
   printing a damp ring.

20. The method of claim 19, further comprising:
   inserting the at least one damp bar into a slot defined by the rotor core; and
   coupling the damp ring to the rotor core after inserting the at least one damp bar into the slot.

* * * * *